United States Patent
Avadhanula et al.

(10) Patent No.: US 9,507,572 B2
(45) Date of Patent: *Nov. 29, 2016

(54) TIME-BASED OPERATIONS VIA TEXTUAL CODE IN A TECHNICAL COMPUTING ENVIRONMENT

(71) Applicant: The MathWorks, Inc., Natick, MA (US)

(72) Inventors: Srinath Avadhanula, Sudbury, MA (US); Pieter J. Mosterman, Framingham, MA (US); Ebrahim Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,028

(22) Filed: May 23, 2014

(65) Prior Publication Data

US 2014/0359568 A1 Dec. 4, 2014

Related U.S. Application Data

(60) Provisional application No. 61/827,863, filed on May 28, 2013.

(51) Int. Cl.
*G06F 9/44* (2006.01)
*G06F 9/45* (2006.01)

(52) U.S. Cl.
CPC . *G06F 8/35* (2013.01); *G06F 8/10* (2013.01); *G06F 8/34* (2013.01); *G06F 8/51* (2013.01); *G06F 9/4425* (2013.01)

(58) Field of Classification Search
None
See application file for complete search history.

(56) References Cited

U.S. PATENT DOCUMENTS 5,313,574 A * 5/1994 Beethe ............... G06F 9/4843
715/763
5,497,500 A * 3/1996 Rogers ............... G06F 3/0481
714/E11.217

(Continued)

FOREIGN PATENT DOCUMENTS

WO  WO 2007/027622  3/2007

OTHER PUBLICATIONS

The MathWorks, Inc. "Using Simulink Version 4". Jun. 2001. The MathWorks, Inc. Revised for Simulink 4.1, Release 12.1. pp. 9-1,2,3,6,7,74,75.*

(Continued)

*Primary Examiner* — Emerson Puente
*Assistant Examiner* — Erika Kretzmer
(74) *Attorney, Agent, or Firm* — Harrity & Harrity, LLP

(57) ABSTRACT

A device may receive a state chart generated via a technical computing environment. The state chart may include a state block with a single section of textual code. The single section of textual code may include a time-based portion and an output portion. The device may initiate execution of the state chart, and may process, during the execution of the state chart, the time-based portion with a graphical engine of the technical computing environment to generate a time-based method. The device may process, during the execution of the state chart, the output portion with a textual engine of the technical computing environment to generate an output method. The device may provide the time-based method and the output method in output code, where the time-based method may be separate from the output method in the output code.

20 Claims, 16 Drawing Sheets

(56) References Cited

U.S. PATENT DOCUMENTS

| | | | | |
|---|---|---|---|---|
| 5,821,934 A * | 10/1998 | Kodosky | G06F 3/04847 | 703/15 |
| 6,282,699 B1 | 8/2001 | Zhang et al. | | |
| 7,020,850 B2 * | 3/2006 | Raghavan | G06F 8/34 | 703/23 |
| 7,200,843 B2 * | 4/2007 | Shann | G06F 8/54 | 717/162 |
| 7,487,076 B2 * | 2/2009 | Szpak et al. | | 703/14 |
| 7,801,715 B2 * | 9/2010 | Ciolfi et al. | | 703/13 |
| 7,809,545 B2 * | 10/2010 | Ciolfi | G06F 8/34 | 703/22 |
| 7,810,077 B2 * | 10/2010 | Bracha | G06F 8/315 | 717/118 |
| 7,823,121 B1 * | 10/2010 | Zarrinkoub | G06F 8/34 | 715/763 |
| 7,941,303 B1 | 5/2011 | Raghavan et al. | | |
| 8,234,630 B2 * | 7/2012 | Raghavan et al. | | 717/125 |
| 8,271,943 B2 * | 9/2012 | Hudson, III | G06F 8/34 | 717/113 |
| 8,423,981 B2 * | 4/2013 | Hudson, III | G06F 8/34 | 717/114 |
| 8,655,636 B2 * | 2/2014 | Kumar | G06F 9/444 | 703/13 |
| 8,793,602 B2 * | 7/2014 | Szpak | G06F 8/31 | 717/104 |
| 8,943,466 B2 * | 1/2015 | Bray | G06F 8/34 | 717/106 |
| 2002/0170041 A1 * | 11/2002 | Shann | G06F 8/54 | 717/141 |
| 2003/0046658 A1 * | 3/2003 | Raghavan | G06F 8/34 | 717/106 |
| 2005/0096894 A1 * | 5/2005 | Szpak et al. | | 703/13 |
| 2005/0160397 A1 * | 7/2005 | Szpak | G06F 8/31 | 717/104 |
| 2005/0216248 A1 * | 9/2005 | Ciolfi et al. | | 703/22 |
| 2006/0139587 A1 * | 6/2006 | Rossing | G03F 7/70483 | 355/53 |
| 2007/0067761 A1 * | 3/2007 | Ogilvie | G06F 8/34 | 717/146 |
| 2007/0261019 A1 * | 11/2007 | Raghavan et al. | | 717/105 |
| 2008/0022259 A1 * | 1/2008 | MacKlem | G06F 8/34 | 717/113 |
| 2008/0022264 A1 * | 1/2008 | Macklem | G06F 8/34 | 717/136 |
| 2008/0127058 A1 * | 5/2008 | Bray | G06F 8/34 | 717/106 |
| 2008/0270920 A1 * | 10/2008 | Hudson | G06F 8/34 | 715/763 |
| 2009/0327942 A1 * | 12/2009 | Eldridge | G06F 8/34 | 715/771 |
| 2010/0325617 A1 * | 12/2010 | Hudson, III | G06F 8/34 | 717/140 |
| 2011/0320178 A1 * | 12/2011 | Kumar | G06F 9/444 | 703/2 |
| 2014/0359560 A1 * | 12/2014 | Avadhanula et al. | | 717/105 |
| 2014/0359561 A1 * | 12/2014 | Avadhanula et al. | | 717/105 |
| 2014/0359566 A1 * | 12/2014 | Avadhanula et al. | | 717/109 |
| 2014/0359567 A1 * | 12/2014 | Avadhanula et al. | | 717/109 |
| 2014/0359568 A1 * | 12/2014 | Avadhanula et al. | | 717/109 |
| 2014/0359569 A1 * | 12/2014 | Avadhanula et al. | | 717/109 |
| 2015/0106781 A1 * | 4/2015 | Adler | G06F 9/4436 | 717/104 |

OTHER PUBLICATIONS

Notification of Transmittal of the International Search Report and The Written Opinion of the International Searching Authority, or the Declaration corresponding to PCT/US2014/039574, mailed on Nov. 10, 2014, 10 pages.

The MathWorks, "Stateflow® 7, User's Guide", The MathWorks, Inc., Matlab and Simulink, © 1997-2011, 1509 pages.

* cited by examiner

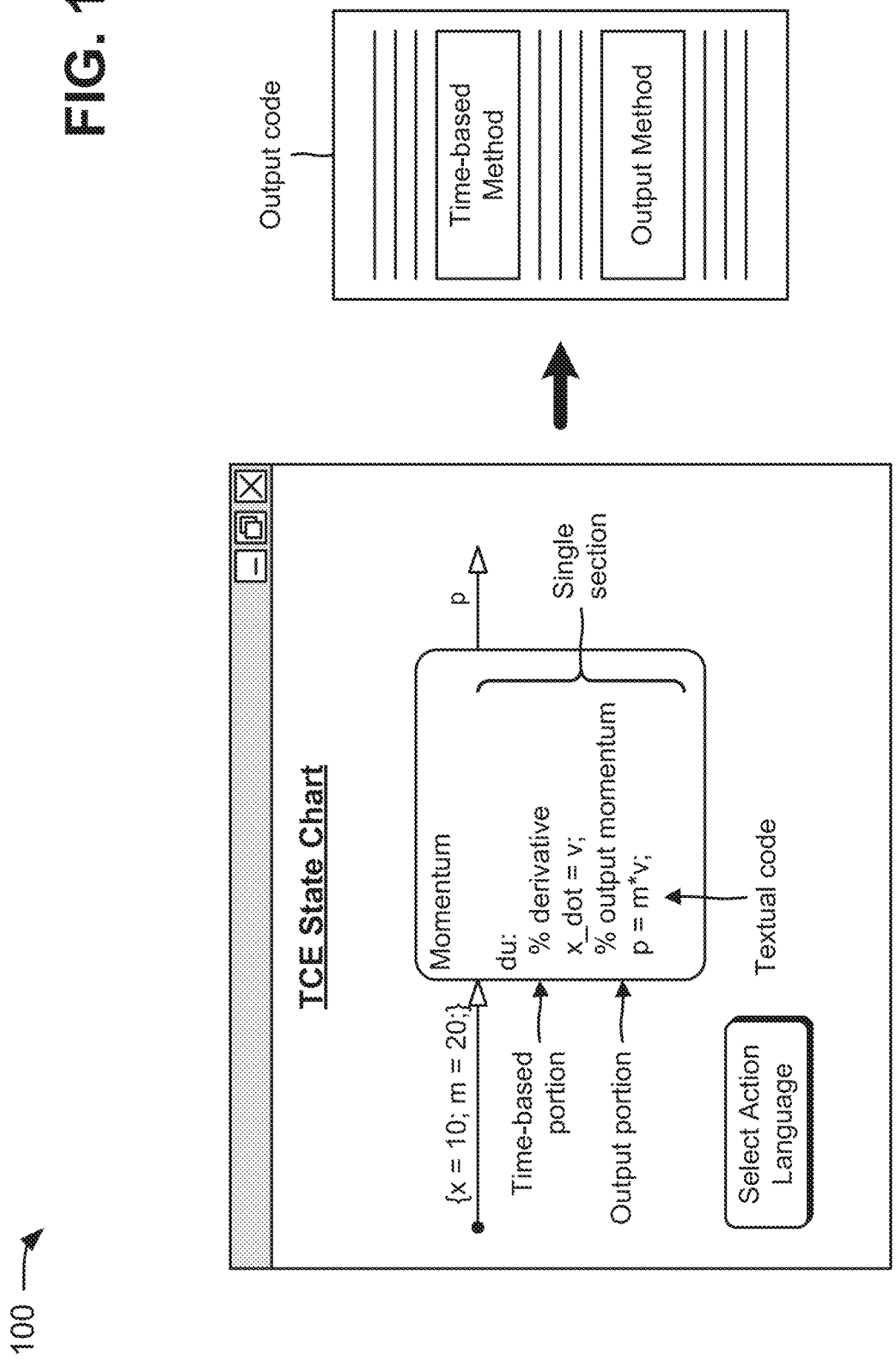

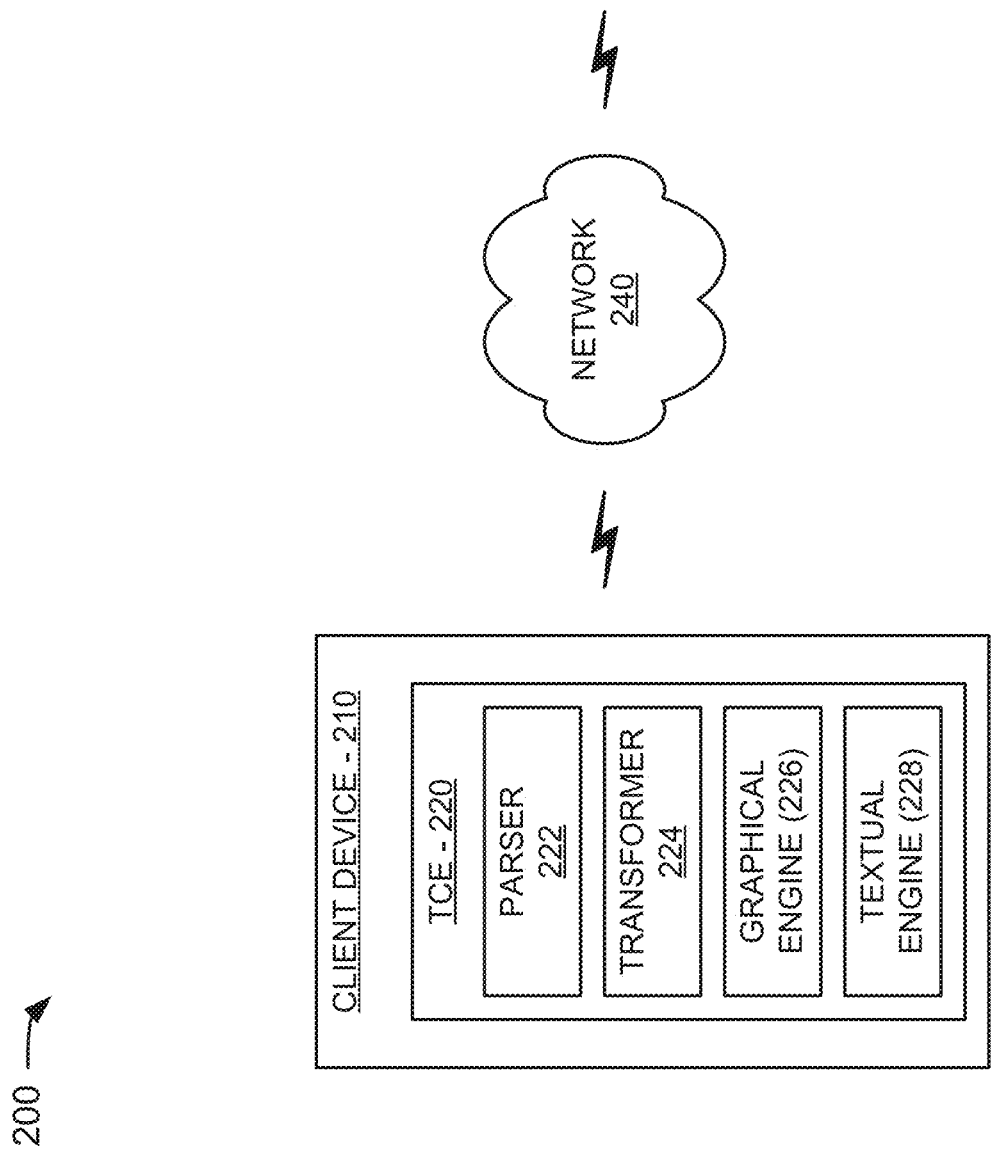

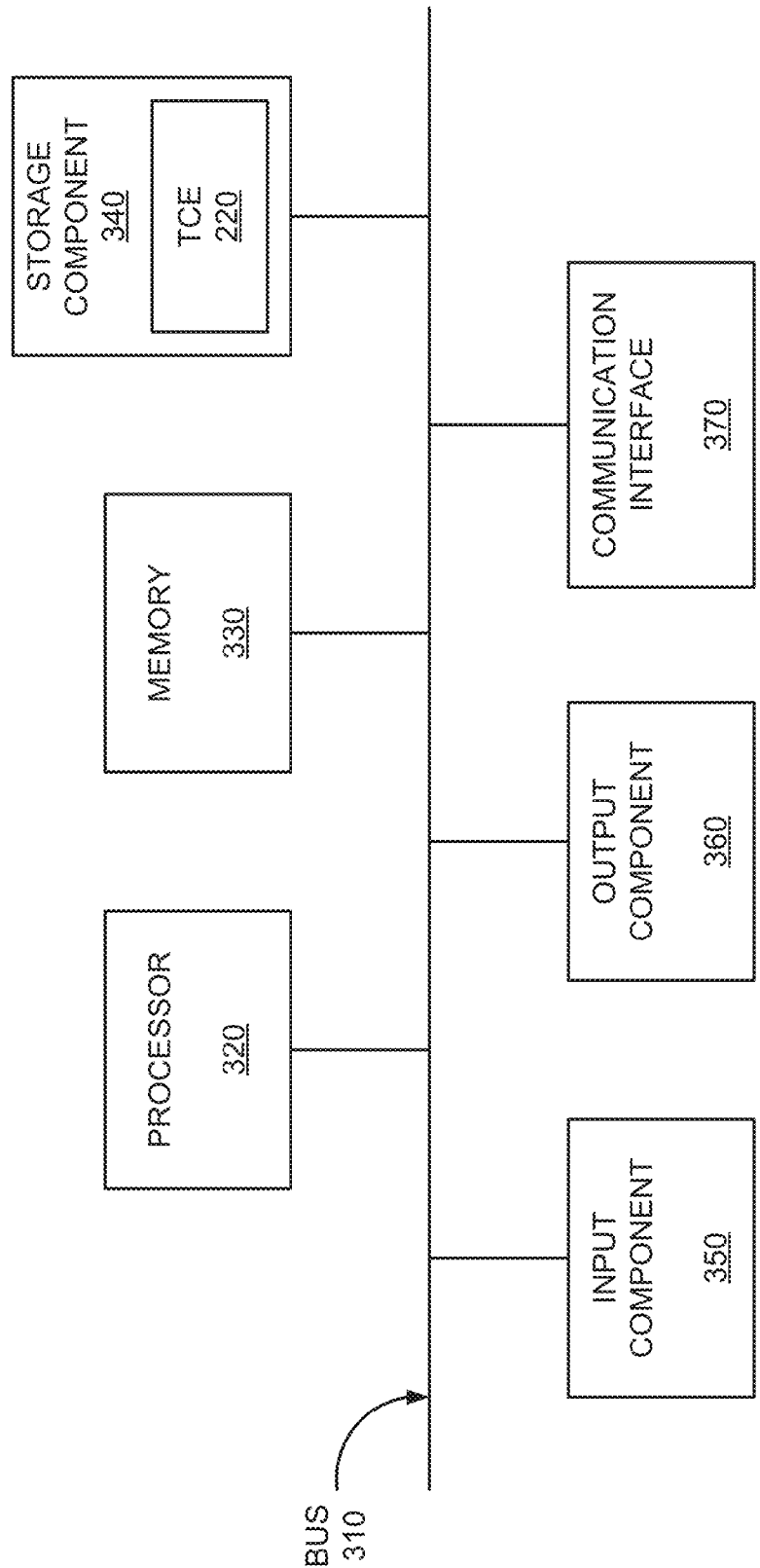

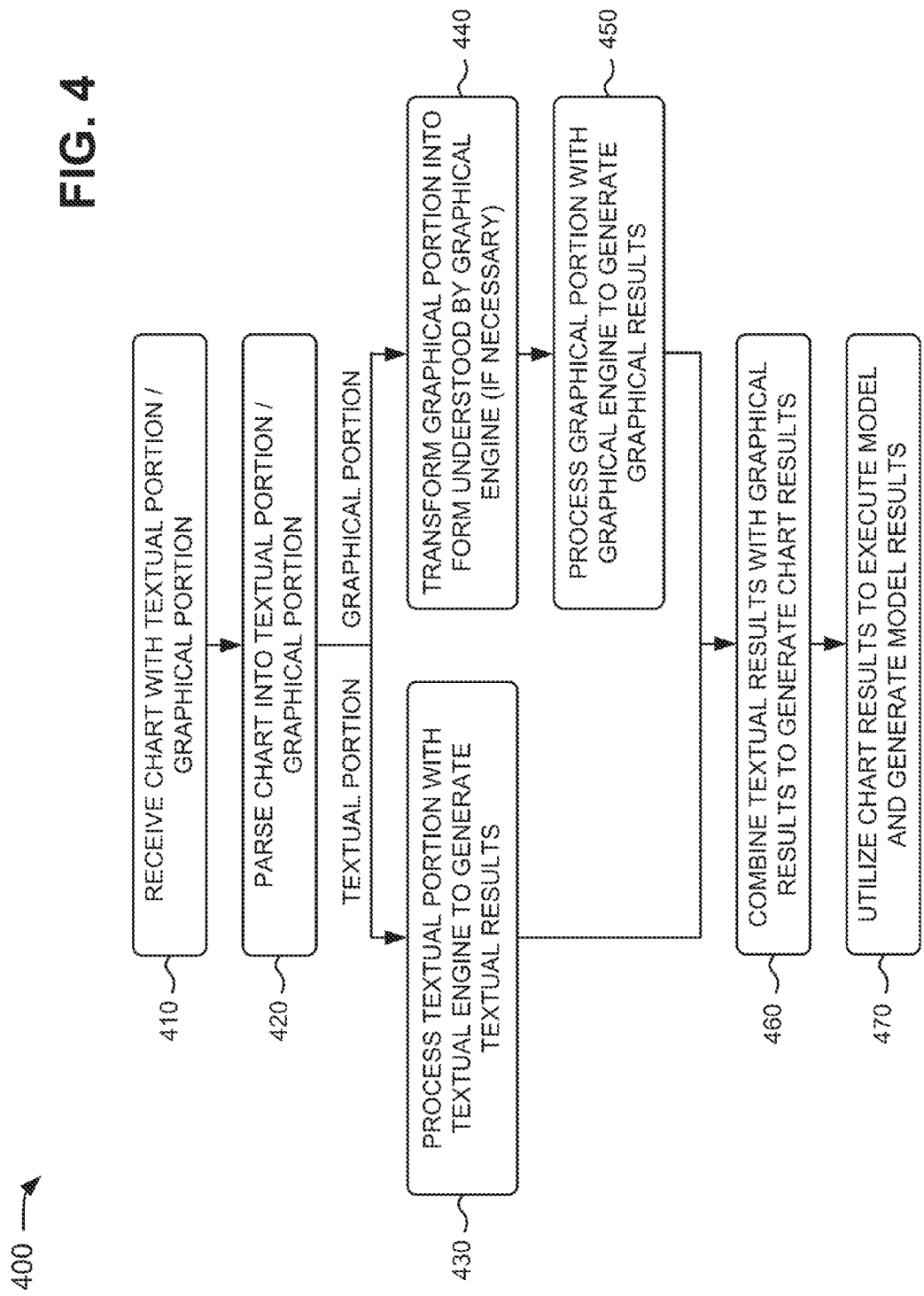

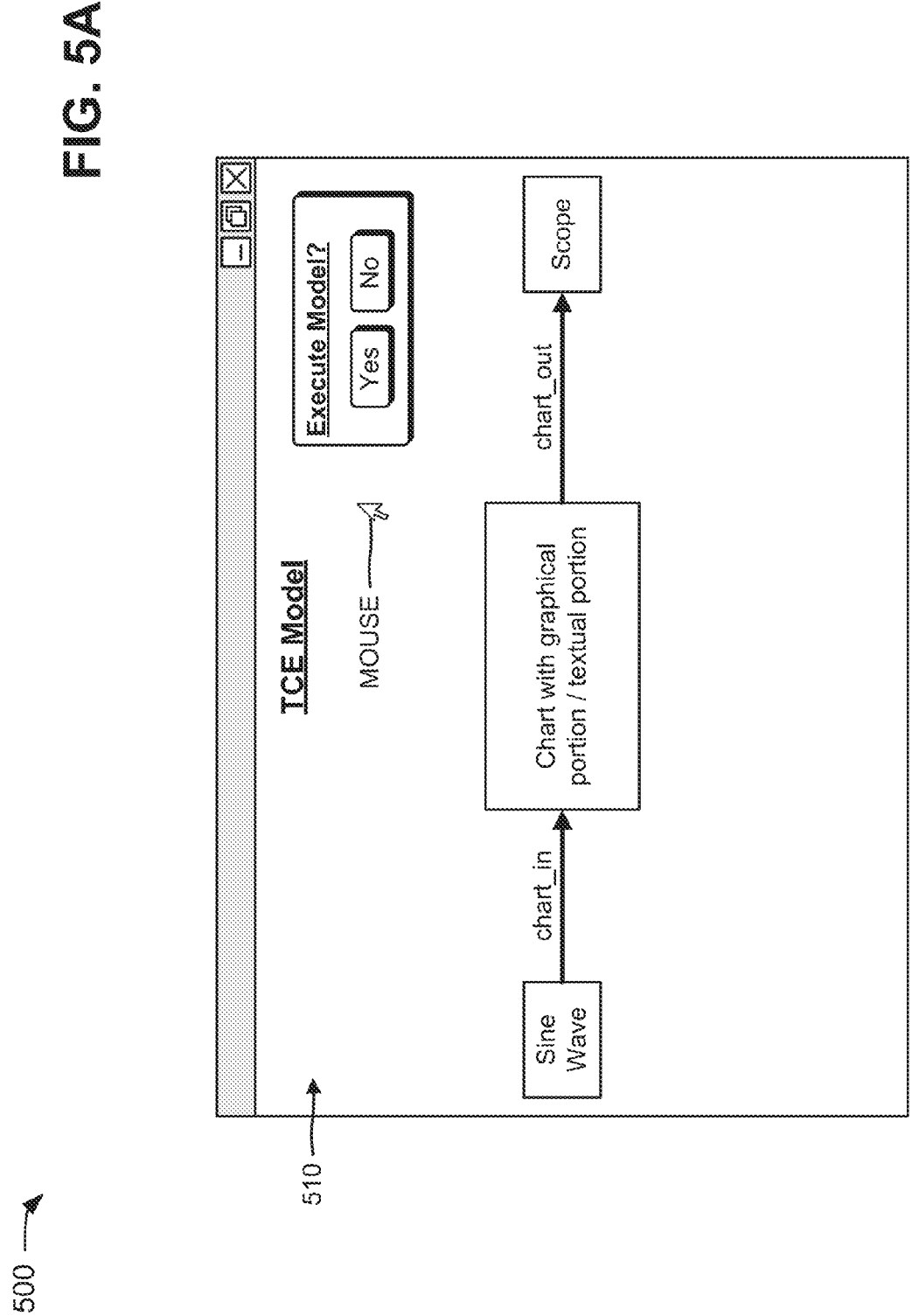

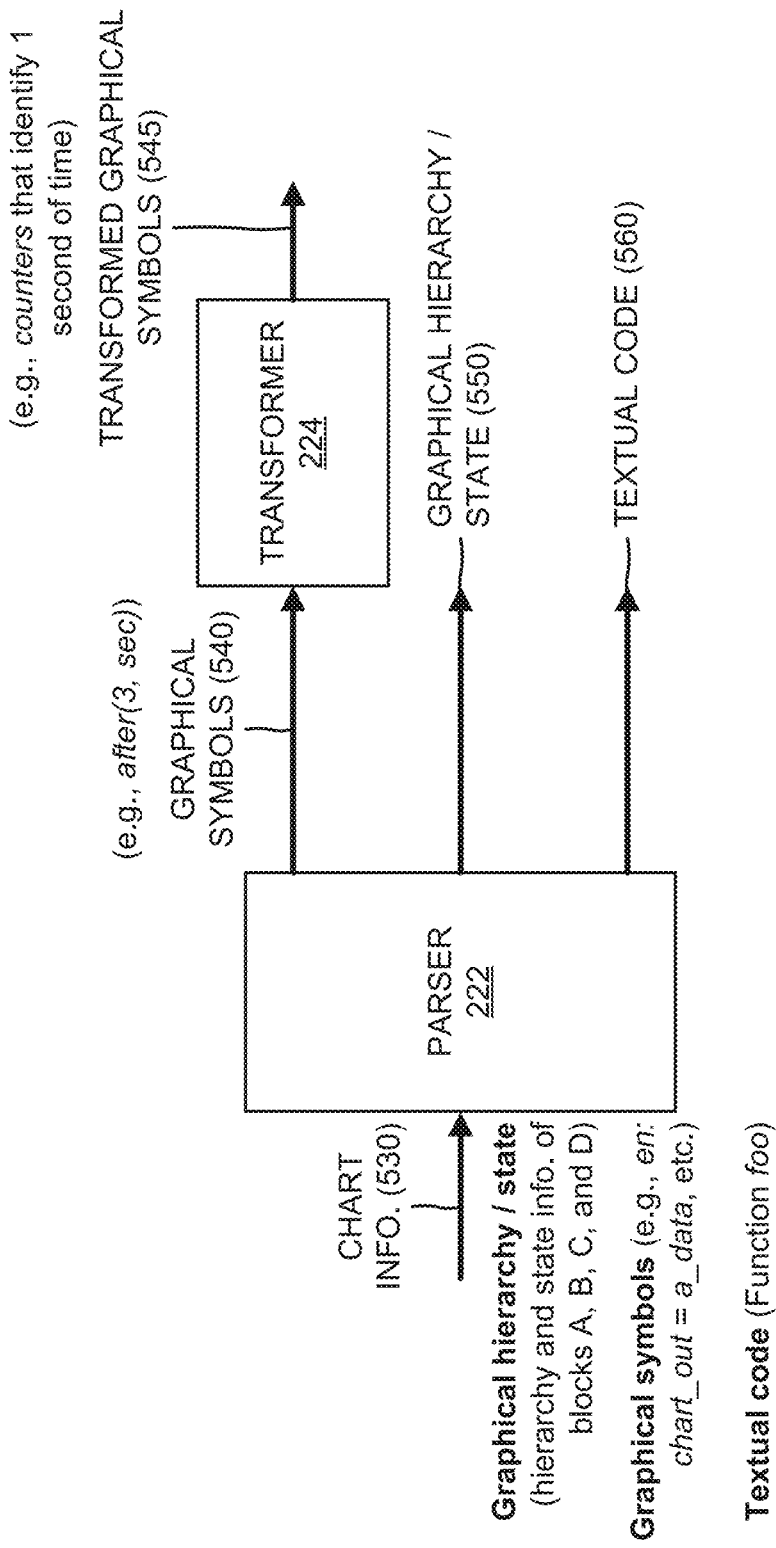

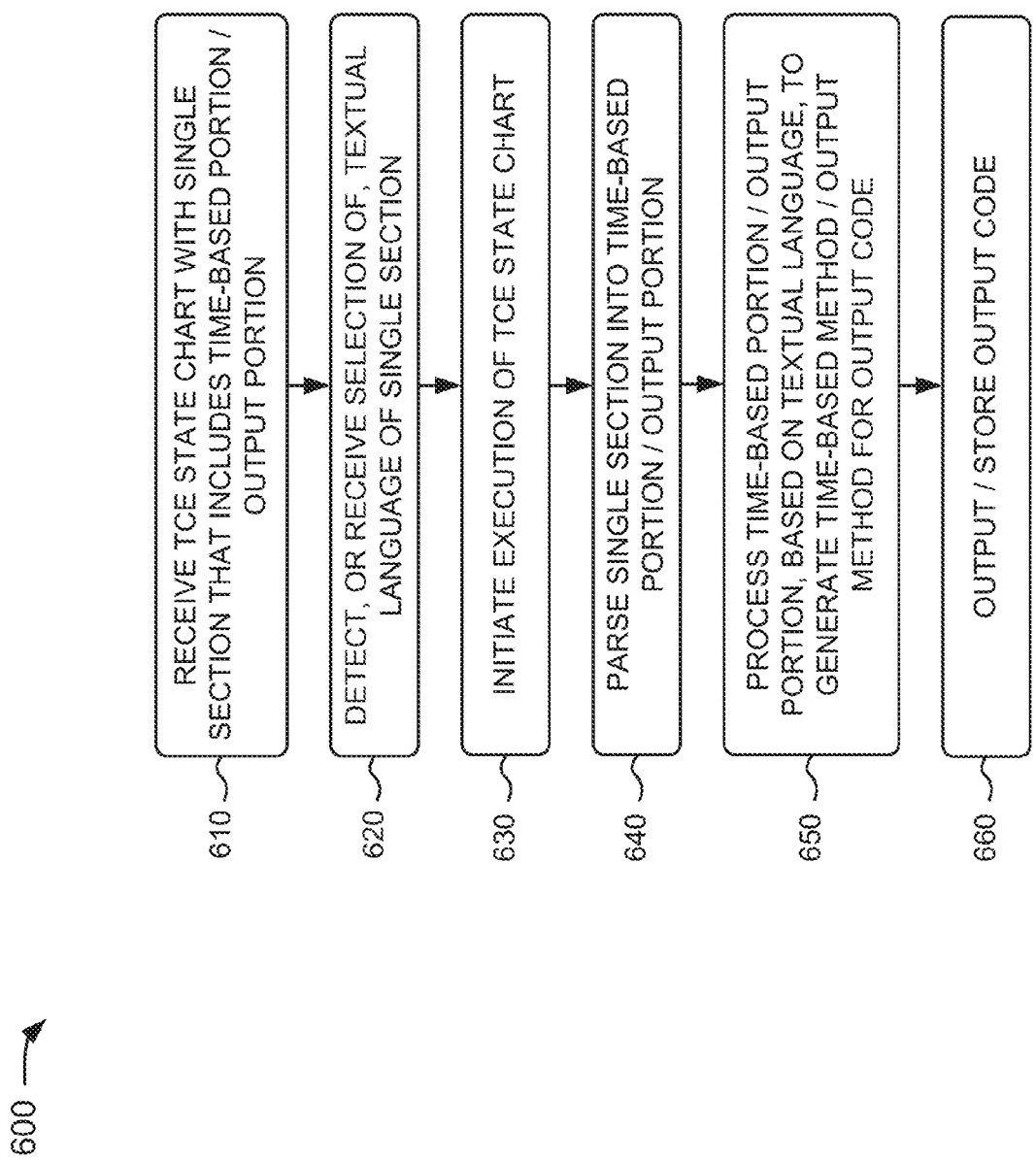

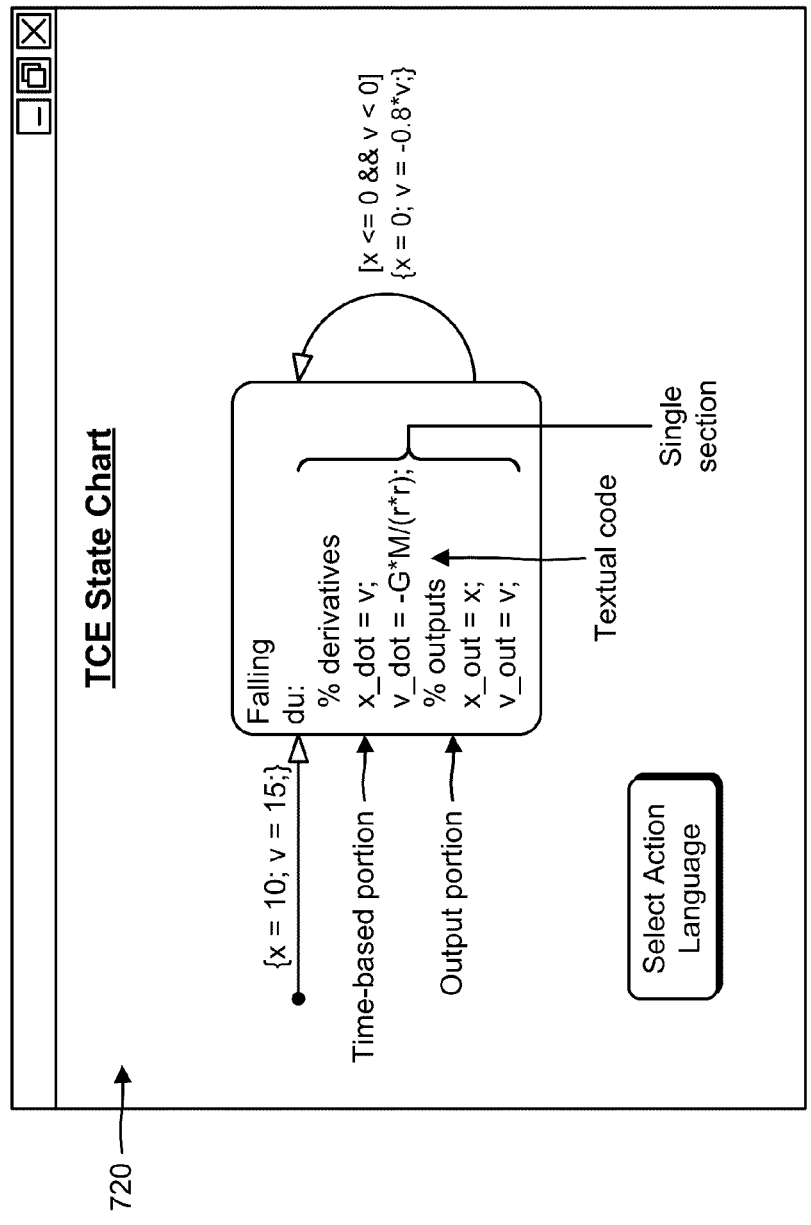

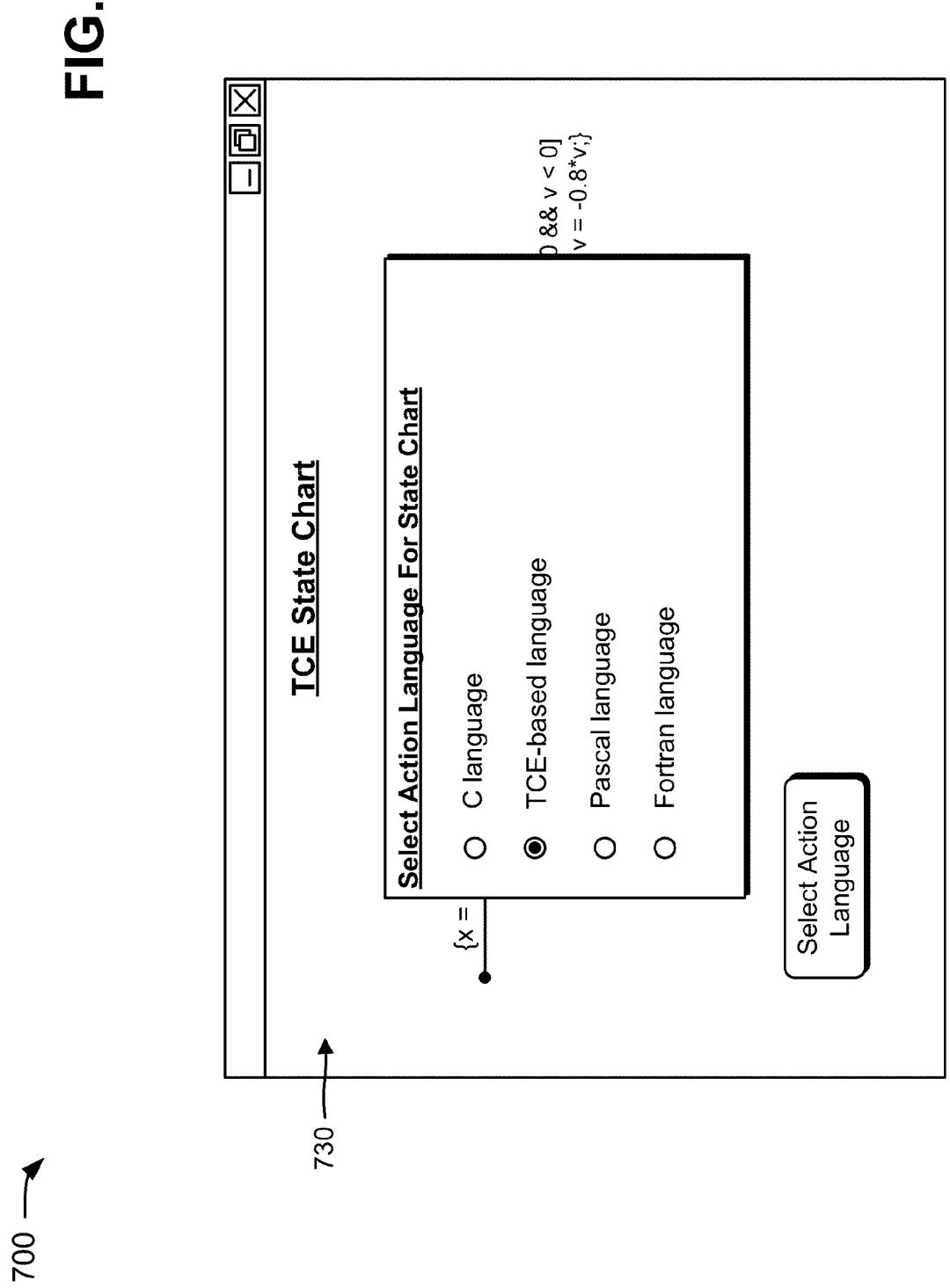

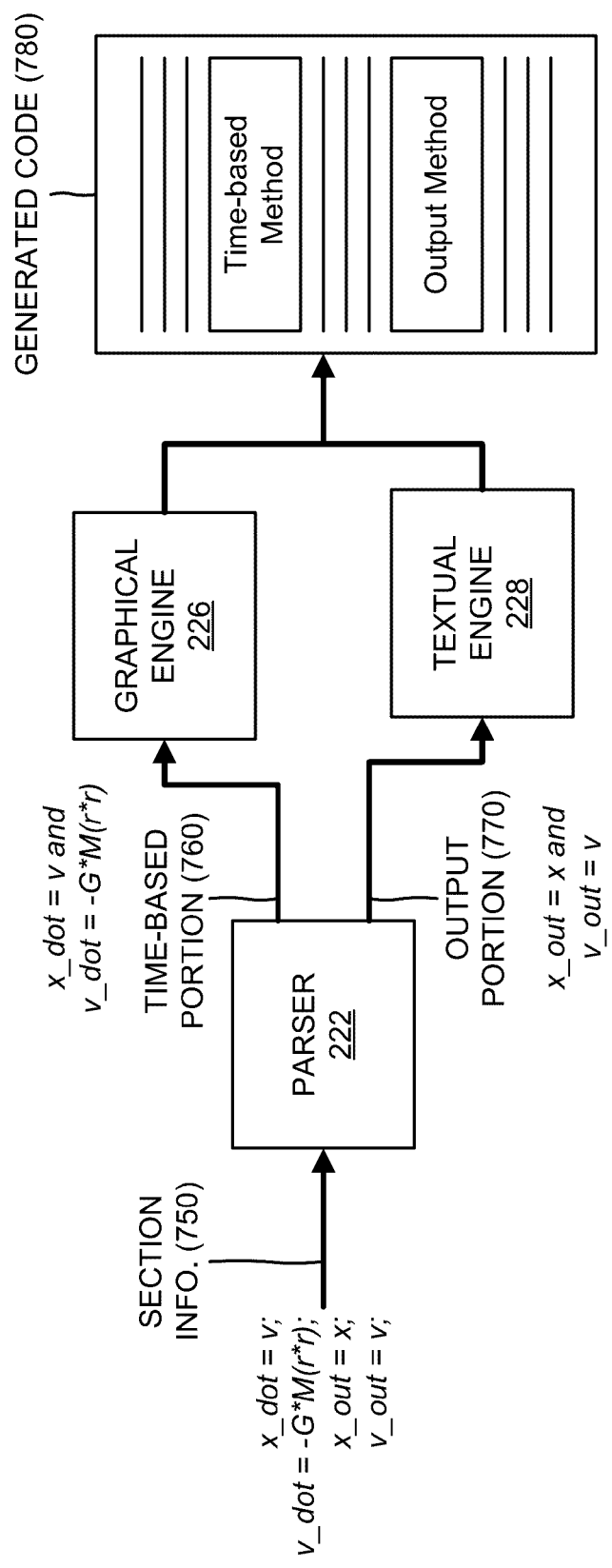

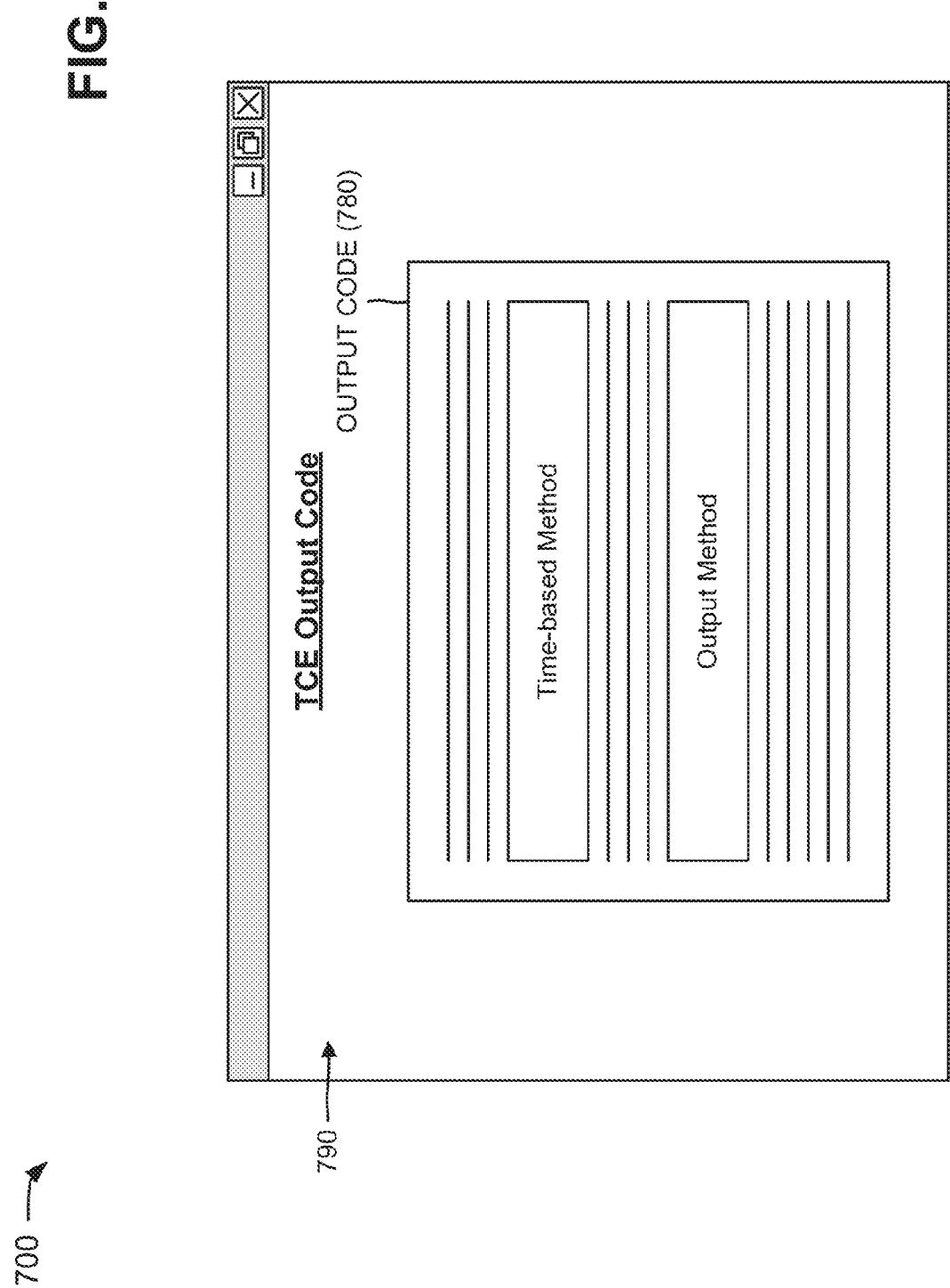

TIME-BASED OPERATIONS VIA TEXTUAL CODE IN A TECHNICAL COMPUTING ENVIRONMENT

RELATED APPLICATION

This application claims priority under 35 U.S.C. §119 based on U.S. Provisional Patent Application No. 61/827,863, filed May 28, 2013, the disclosure of which is incorporated by reference herein in its entirety.

BRIEF DESCRIPTION OF THE DRAWINGS

FIG. 1 is a diagram of an overview of an example implementation described herein;

FIG. 2 is a diagram of an example environment in which systems and/or methods described herein may be implemented;

FIG. 3 is a diagram of example components of one or more devices of FIG. 2;

FIG. 4 is a flow chart of an example process for processing textual and graphical portions of a technical computing environment chart;

FIGS. 5A-5E are diagrams of an example relating to the example process shown in FIG. 4;

FIG. 6 is a flow chart of an example process for performing time-based operations via textual code in a technical computing environment; and FIGS. 7A-7F are diagrams of an example relating to the example process shown in FIG. 6.

DETAILED DESCRIPTION

Figure 5B:
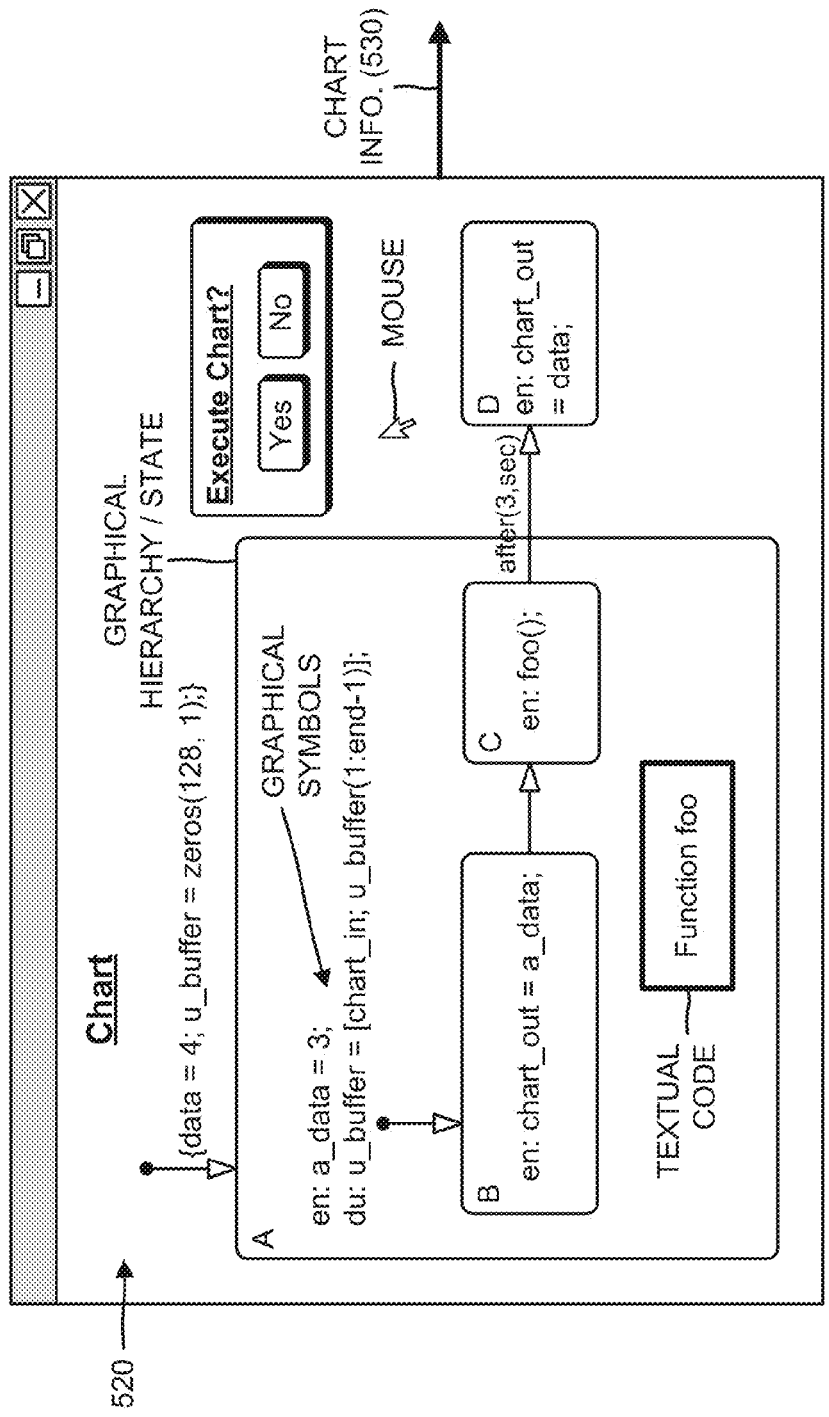

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements.

The TCE may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc. The TCE may exist for creating computer-generated models, such as graphical behavioral models, that represent dynamic systems. A model may include a plurality of graphical objects, such as blocks or icons. A model may be executed to simulate the operation or behavior of the system being modeled. Executing the model may be referred to as simulating the model.

The TCE may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment includes an imperative or declarative language with no concept of logical, model, physical, and/or simulation time and events.

Conventional action languages for the graphical environment (e.g., Stateflow) consisted of statically-typed, scalar-based languages, such as, for example, C, C++, etc. FIG. 1 is a diagram of an overview of an example implementation 100 described herein. In the example, a textual environment of the TCE may be provided in a graphical environment of the TCE. Time-based and event-based simulation may be introduced into the language of the textual environment, while maintaining the syntax and style of the language. The textual environment may have no concept of time or events without a user explicitly maintaining timers in the textual environment language. The graphical environment may enable a user to perform a time-based operation (e.g., a derivative with respect to time) on a variable using a particular notation (e.g., "x_dot," where "x" may refer to a continuous variable). The graphical environment may automatically translate the particular notation into a time derivative of the continuous time variable. Time may be based on simulation, model, or logical time and not on a timer based on a clock time.

As shown below in FIG. 1, the textual environment may be enhanced so that textual code understood by the textual environment may be utilized with time-based operations, such as derivatives, etc. With reference to FIG. 1, a user may utilize a TCE of a computing device to create or import a state chart that includes a state block. The state block may include a representation of a momentum calculation to be performed. As further shown in FIG. 1, the state block may receive inputs for calculating the momentum of an object. For example, the inputs may include an initial distance (e.g., x=10 meters) of the object and a mass (e.g., m=20 kilograms) of the object. The state block may include a single section of textual code that is understood by a textual environment and/or a graphical environment of the TCE.

The single section may include a time-based portion and an output portion. The time-based portion may include textual code that is based on time. For example, the time-based portion may include a derivative (e.g., x_dot) of the distance (x) of the object. The derivative of the distance (x) may provide a velocity (v) of the object (e.g., in meters/second). The output portion may include an output that is associated with the derivative of the distance. For example, the output portion may include a calculation of the momentum (e.g., p=m*v) of the object (e.g., in kilogram-meters/second). The state block may output the calculated momentum (p).

As further shown in FIG. 1, the TCE may cause the computing device to display a selection mechanism (e.g., a button, an icon, a menu, etc.) that, when selected, enables the user to select an action language for the textual code of the single section. For example, the user may select a TCE-based language, the C language, the Pascal language, the Fortran language, etc. as the action language for the textual code. In some implementations, the TCE may automatically detect the action language (e.g., an object-oriented language, a procedural language, a functional language, an equation-based language, an assignment-based language, an imperative language, a declarative language, etc.) used for the textual code of the single section. The textual environment of the TCE may have no concept of logical time, model time, and/or simulation time.

After the state chart is created or imported, the user may utilize the computing device to initiate execution of the state chart. During execution of the state chart, the TCE may parse the single section into the time-based portion and the output portion. The TCE may process the time-based portion and the output portion, based on the action language, to generate output code, as shown in FIG. 1. For example, the graphical environment of the TCE may process the time-based portion to generate a time-based method for the output code. The textual environment of the TCE may process the output portion to generate an output method for the output code. The output code may include code (e.g., C code, C++ code, Hardware Description Language (HDL) code, etc.) that may be utilized by a physical device (e.g., a robot, manufacturing equipment, etc.). The TCE may cause the computing device to embed the output code in one or more physical devices.

Such an arrangement may enable a user of a TCE to utilize the language of the textual environment with dynamic systems (e.g., time-based systems) provided by the graphical environment. This may provide the user with tools to create a variety of state charts and/or models based on the language of the textual environment.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in math-ematical notations. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); and a graphically-based environment (e.g., Simulink®, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

In some implementations, TCE 220 may provide a graphical environment for modeling and simulating combinatorial and sequential decision logic based on state machines and flow charts. The decision logic may enable users to combine graphical and tabular representations, including state transition diagrams, flow charts, state transition tables, and truth tables, to model how a system reacts to events, time-based conditions, and external input signals. The graphical environment may generate models, such as a textual model; a graphical model with one or more model elements (e.g., blocks), one or more input signals, and one or more output signals; a combination of a textual model and a graphical model; etc.

In some implementations, TCE 220 may provide a textual environment that includes a high-level language and an interactive environment for numerical computation, visualization, and programming. The textual environment may enable users to analyze data, develop algorithms, create models and applications, manipulate matrices, plot functions and data, implement algorithms, create user interfaces, and interface with programs written in other languages, including C, C++, Java, and Fortran. Unlike the graphical environment, which models how a system reacts to events and time-based conditions, the textual environment may include an assignment-based, imperative language with no concept of logical, model, physical, and/or simulation time and events.

In some implementations, and as further shown in FIG. 2, TCE 220 may include a parser 222, a transformer 224, a graphical engine 226, and a textual engine 228. Parser 222 may include a component that parses TCE code (e.g., a model or a chart) into a graphical portion and a textual portion. The graphical portion may include information associated with a graphical hierarchy, graphical symbols, etc. of the TCE code. The textual portion may include information associated with textual code of the TCE code that may be understood by textual engine 228. In some implementations, parser 222 may parse the textual portion into two or more portions (e.g., a time-based portion and an output portion), and may parse the graphical portion into two or more portions (e.g., a functional portion and a non-functional portion). In some implementations, parser 222 may parse TCE code into other types of portions.

Transformer 224 may include a component that receives the graphical portion of the TCE code that is not understood by graphical engine 226. For example, one or more graphical symbols may not be understood by graphical engine 226 and may be provided to transformer 224. Transformer 224 may transform the received graphical portion into a form that is understood by graphical engine 226.

Graphical engine 226 may receive the transformed graphical portion and the graphical portion that did not need to be transformed, and may process the received information. The processing of the received information may include generating graphical results, such as, for example, how a system reacts to events, time-based conditions, and external input signals. In some implementations, graphical engine 226 may include Simulink® software, Stateflow® software, Simscape™ software, and/or SimEvents® software.

Textual engine 228 may receive the textual portion, and may process the textual portion to generate textual results, such as, for example, data analysis results, matrix calculation results, array calculation results, etc. Graphical engine 226 may combine the graphical results with the textual results to generate combined results that may be understood by the graphical environment and the textual environment. In some implementations, textual engine 228 may include MATLAB software.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for processing textual and graphical portions of a technical computing environment chart. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving a chart with a textual portion and a graphical portion (block 410). For example, TCE 220 may enable a user of client device 210 to create a model or to instruct client device 210 to receive the model from another source (e.g., server device 230, a CD-ROM, a flash memory, etc.). In some implementations, the model may include a chart with a graphical hierarchy of one or more chart elements (e.g., areas or regions associated with one or more states, referred to herein as "state blocks"), one or more input signals, and one or more output signals. For example, assume that a chart has state blocks A, B, and C, and that state block A includes state block B and a transition to state block C. An arrangement that includes a state block containing one or more state blocks and/or transitions to one or more state blocks may be referred to as a graphical hierarchy. Each of the chart elements may correspond to a status of a physical device, a subsystem, a model, etc. of a system being modeled (e.g., chart elements may behavioral so that a state may correspond to a status of a device, a subsystem, etc.).

In some implementations, the chart may include graphical symbols, transitions, and/or state transitions associated with the state blocks of the chart. The graphical symbols may include, for example, textual information that provides event-based conditions, time-based conditions, invariants, etc. to the state blocks, transitions, junctions, etc. In some implementations, one or more of the state blocks, transitions, and/or state transitions, may include textual code that may be understood and processed by textual engine 228 of TCE 220. The textual code may include, for example, one or more functions, matrices, data, etc. that may be understood and processed by textual engine 228.

In some implementations, TCE 220 may cause client device 210 to display a user interface so that the user may create and/or view the model and the chart. For example, the user may utilize the user interface to create the state blocks for the chart, and to connect the state blocks together. The user may associate the graphical symbols with the state blocks and/or other elements of the chart (e.g., transitions, state transitions, junctions, etc.), and may add the textual code in the one or more state blocks. The user may utilize the user interface to provide the chart within the model.

As further shown in FIG. 4, process 400 may include parsing the chart into a textual portion and a graphical portion (block 420). For example, parser 222 of TCE 220 may receive information associated with the chart, and may identify, based on the information, a portion of the chart that may be understood and processed by textual engine 228 (e.g., a textual portion) and a portion of the chart that may be understood and processed by graphical engine 226 (e.g., a graphical portion). In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as the textual portion. For example, parser 222 may designate functions, arrays, matrices, algorithms, etc. in the chart as the textual portion.

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as the graphical portion. For example, parser 222 may designate time-based conditions, event-based conditions, other conditions, hierarchy information, etc. as the graphical portion.

As further shown in FIG. 4, for the textual portion (block 420—TEXTUAL PORTION), process 400 may include processing the textual portion with the textual engine to generate textual results (block 430). For example, parser 222 may provide the textual portion of the chart to textual engine 228, and textual engine 228 may process the textual portion of the chart to generate textual results. In some implementations, textual engine 228 may execute the textual portion of the chart to generate the textual results. For example, assume that the textual portion of the chart includes a function for performing matrix calculations on data. In such an example, textual engine 228 may execute the function so that the matrix calculations are performed on the data. The matrix resulting from the calculations may be referred to as textual results. In another example, assume that the textual portion of the chart includes an algorithm for performing data analysis. In this example, textual engine 228 may execute the algorithm so that the data analysis is performed. The results of the data analysis may be referred to as textual results.

As further shown in FIG. 4, for the graphical portion (block 420—GRAPHICAL PORTION), process 400 may include transforming, if necessary, the graphical portion into a form understood by the graphical engine (block 440). For example, parser 222 may determine whether any of the graphical portion of the chart will not be understood by graphical engine 226. In some implementations, parser 222 may identify text in the graphical portion that may not be understood by graphical engine 226. For example, assume that the graphical portion includes the text before(abs(a*eig (b(1:10, 1:10))), sec), and that graphical engine 226 does not understand the text since graphical engine 226 needs to calculate a time to execute the text. In this example, parser 222 may provide the text to transformer 224, and transformer 224 may transform the text into a form understood by graphical engine 226. For example, transformer 224 may transform the text to utilize counters maintained by the graphical environment (e.g., Simulink) so that a time (e.g., one second, two seconds, etc.) may be calculated by graphical engine 226. In some implementations, transformer 224 may provide the transformed text to graphical engine 226 for processing. In some implementations, the text provided in the graphical portion may include textual operations (e.g., after(abs(a*eig(b(1:10, 1:10))), sec)) that are understood by the textual environment, such as, for example, TCE operations.

In some implementations, parser 222 may provide the remaining graphical portion (e.g., which may be understood by graphical engine 226) directly to graphical engine 226. In some implementations, parser 222 may determine that all of the graphical portion may be understood by graphical engine 226. In such a situation, parser 222 may provide the entire graphical portion to graphical engine 226 and transformer 224 may not be utilized.

As further shown in FIG. 4, for the graphical portion (block 420—GRAPHICAL PORTION), process 400 may include processing the graphical portion with the graphical engine to generate graphical results (block 450). For example, parser 222 may provide, to graphical engine 226, the graphical portion of the chart that is understood by graphical engine 226. Transformer 224 may provide, to graphical engine 226, any of the graphical portion that has been transformed into a form that is understood by graphical engine 226. Graphical engine 226 may process the graphical portion of the chart to generate graphical results. In some implementations, graphical engine 226 may execute the graphical portion of the chart to generate the graphical results. For example, assume that the graphical portion of the chart includes instructions to combine graphical and tabular representations. In such an example, graphical engine 226 may execute the instructions so that the graphical and tabular representations are combined. The resulting combination may be referred to as graphical results. In another example, assume that the graphical portion of the chart includes an event-based condition (e.g., transition to state block A when a function is calculated). In this example, graphical engine 226 may execute the event-based condition so that state block A is transitioned to. The results of the execution of the event-based condition may be referred to as graphical results. In some implementations, graphical engine 226 may execute textual information.

As further shown in FIG. 4, process 400 may include combining the textual results with the graphical results to generate chart results (block 460). For example, TCE 220 may combine the textual results, generated by textual engine 228, with the graphical results generated by graphical engine 226 to generate chart results. In some implementations, the chart results may include results associated with execution of the chart. For example, assume that the textual results include a calculation of a function bar and that the graphical results include utilizing the calculation when a state block B is transitioned to. In such an example, the chart results may include transitioning to state block B and utilizing the calculation of the function bar. In another example, assume that the textual results include performing a matrix calculation and that the graphical results include computing the time period based on the array-based computations. In such an example, the chart results may include determining when the time period has expired and utilizing the matrix calculation after the time period has expired and/or utilizing the matrix calculation to determine the time period. In some implementations, the chart may model reactive systems via state machines and flow charts within a model. In some implementations, the chart may use a variant of a finite-state machine notation, which may enable representation of hierarchy, parallelism, event broadcast, and/or history within the chart. In some implementations, the chart may provide state transition tables and/or truth tables. In some implementations, the chart may represent discrete modes of a system by a state, may control how a system responds to faults and failures within the system, and may schedule when specific tasks occur (e.g., either within the chart or within an overall model).

As further shown in FIG. 4, process 400 may include utilizing the chart results to execute the model and generate model results (block 470). For example, TCE 220 may utilize the chart results in the model (e.g., during execution of the model) to generate model results. In some implementations, the model results may include results associated with execution of the model based on the chart results. For example, assume that the chart results include transitioning to state block B and utilizing a calculation of a function bar. After state block B is transitioned to and the function bar is calculated, TCE 220 may utilize the function calculation in the model to generate the model results. In another example, assume that the chart results include determining when a time period has expired and utilizing the computations to determine the time period. After the matrix calculation is performed, TCE 220 may utilize the matrix calculation in the model to generate the model results and/or to determine the time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example 500 relating to example process 400 shown in FIG. 4. In example 500, assume that a user of client device 210 utilizes TCE 220 to create a model or to import the model into TCE 220. As shown in FIG. 5A, TCE 220 may cause client device 210 to display the model in a user interface 510. The model may include a sine wave block, a chart block, and a scope block.

The sine wave block may include a representation of a sine wave that is to be displayed by the scope block. In example 500, assume that the sine wave block provides a chart_in signal (e.g., a sine wave signal) to the chart block. The chart block may include a representation of a chart that processes the sine wave signal so that it may be understood by the scope block. The chart block may include a graphical portion and a textual portion. The chart block may receive the chart_in signal, and may process the chart_in signal to produce a chart_out signal (e.g., a voltage/time signal to be displayed by the scope block). The chart block may provide the chart_out signal to the scope block. The scope block may include a representation of an oscilloscope that displays constantly varying signal voltages as a function of time. The scope block may receive the chart_out signal, and may display the signal (e.g., a voltage/time signal). In some implementations, the chart block may include a chart (FIG. 5B) that may be executed based on different execution semantics provided by a user and/or inferred from the model. The execution semantics may include dynamic notions associated with continuous time for example, computing the time derivatives of a dynamic system based on matrix calculations, etc. In some implementations, the chart may be provided in an environment that includes multiple domains.

As further shown in FIG. 5A, TCE 220 may instruct client device 210 to display an option to execute the model. For example, user interface 510 may display a window or some other display mechanism that requests whether the user wants to execute the model. If the user elects to execute the model (e.g., via selection of a "Yes" button with a mouse or other selection mechanism), TCE 220 may execute the model. In some implementations, the user may select a "Play" button with the mouse, and TCE 220 may execute the model. In order to execute the model, assume that TCE 220 needs to execute the chart block, as shown in a user interface 520 of FIG. 5B. In some implementations, the model may include computational semantics associated with graphical and textual elements, and may include computational semantics associated with various blocks in the model. In some implementations, TCE 220 may debug the model before or during execution of the model or generation of code.

As shown in user interface 520, the chart may include a graphical hierarchy of state blocks A, B, C, and D. The graphical hierarchy may include the arrangement of the state blocks in the chart. For example, state block A may be transitioned to first, state block B may be transitioned to second, state block C may be transitioned to third, and state block D may be transitioned to last. The state blocks may include state information provided by graphical symbols. For example, state block A may include the graphical symbols en: a_data=3 and du: u_buffer=[chart_in; u_buffer (1:end−1)] (e.g., which may be parsed by graphical engine 226 into a portion "du" that may be understood by graphical engine 226 and another portion "u_buffer=[chart_in; u_buffer(1:end−1)]" that may be understood by textual engine 228); state block B may include the graphical symbols en: chart_out=a_data; state block C may include the graphical symbols en: foo( ); and state block D may include the graphical symbols en: chart_out=data. Some or all of the graphical hierarchy, state blocks A, B, C, and D, and the graphical symbols may be understood by graphical engine 226. State block A may also include textual code (e.g., a function foo) that may be understood by textual engine 228. In some implementations, the textual code may include text for a function (e.g., foo, bar, etc.), text for a matrix (e.g., C=[1, 2, 3]), array-based text, dynamically-typed text, dynamic assignments, script or function name spaces, etc. (e.g., text that ignores certain output arguments, a function with logic that involves a caller's number of output arguments, fixed point quantities that use integer containers to specify approximate floating point values). In some implementations, graphical engine 226 may execute graphical code and textual code (e.g., C code), but may not execute dynamically-typed and/or array-based code. In some implementations, textual engine 228 may execute the dynamically-typed, array-based code.

As further shown in FIG. 5B, when the chart wakes up, the default transitions of the chart may be executed. For example, an action in a default transition (e.g., [data=4; u_buffer=zeros(128, 1);]) may be executed, and state block A may be marked as active. Graphical symbols of state block A (e.g., an entry action en: a_data=3) may be executed, and default transitions inside state block A may be executed to establish an active child of state block A (e.g., mark state block B as active). Graphical symbols of state block B (e.g., an entry action en: chart_out=a_data) may be executed, and the chart execution may be complete (e.g., the chart may go to sleep) since no child states remain. When the chart sleeps, state blocks A and B may be active. A next time the chart wakes up, graphical symbols of state block A (e.g., the during action du: u_buffer=[chart_in; u_buffer(1:end−1)]) may be executed since there are no direct outer transitions of state block A. Outer transitions of state block B may be checked, and, since there is no condition, the transition to state block C may be assumed to be true. Therefore, the chart may transition from state block B to state block C. State block C may become active and state block A may remain active. The chart may keep waking up according to solver settings and/or system dynamics, and may wake up many times or a few times. Every time the chart wakes up, the outer transitions of all active state blocks may be checked, for example, in a top-down manner. If an outer transition of a particular state block is not true, a during action of the particular state block may be executed. Otherwise, a transition may occur to a next state block. This may result in one or more executions of the during action of state block A (e.g., du: u_buffer=[chart_in; u_buffer(1:end−1)]).

At some point, the chart may wake up, with a condition specified in an outer transition of state block C (e.g., after(3, sec)) being true, after state block C is first entered. When this condition is true, a transition from state block C may occur. State block C may be marked as inactive when state block C is exited. State block A may be marked as inactive since the outer transition of state block C (e.g., after(3, sec)) leaves a graphical boundary of state block A. State block C may transition to state block D, and state block D may be marked as active. At this time, only state block D may be active in the chart. Graphical symbols of state block D (e.g., an entry action en: chart_out=data) may be executed at this time.

As further shown in FIG. 5B, TCE 220 may instruct client device 210 to display an option to execute the chart or may automatically execute the chart when the model is executed. For example, user interface 520 may display a window or some other display mechanism that requests whether the user wants to execute the chart. If the user elects to execute the chart (e.g., via selection of a "Yes" button with a mouse or other selection mechanism), TCE 220 may execute the chart to generate chart information 530, as further shown in FIG. 5B. Chart information 530 may include information associated with the graphical hierarchy, state blocks A, B, C, and D, the graphical symbols, the textual code, and/or execution of the graphical hierarchy, state blocks A, B, C, and D, the graphical symbols, and/or the textual code. In some implementations, the chart may be executed based on conditions in a model (e.g., a time-based block diagram model). For example, if a temperature in a model of an HVAC system exceeds a certain value (e.g., at a particular time), a status of a heater device may change from on to off.

In some implementations, TCE 220 may begin searching at a lowest level of the graphical hierarchy for data and/or a function and move up the graphical hierarchy level by level until the data/function is found. In some implementations, TCE 220 may include a global or logical workspace that may be searched first or last, for example, for data and/or a function. In some implementations, TCE 220 may execute the chart by executing one or more transitions, by executing in microsteps, by executing all events and actions at a hierarchical level, etc. Each microstep may result in a set of transitions that result in a stable state configuration (e.g., the result of one state chart execution). A state machine may continue to execute microsteps until no state transitions are possible from a current state configuration.

As shown in FIG. 5C, assume that TCE 220 provides chart information 530 to parser 222. For example, TCE 220 may provide, to parser 222, the information associated with the graphical hierarchy and the state of the chart (e.g., the hierarchy and active state information of state blocks A, B, C, and D); the information associated with the graphical symbols (e.g., chart_out=data, after(3, sec), etc.); the information associated with the textual code (e.g., the function foo); and/or the execution of the graphical hierarchy, state blocks A, B, C, and D, the graphical symbols, and/or the textual code. Parser 222 may parse chart information 530 into information 540 associated with graphical symbols that are not understood by graphical engine 226; information 550 associated with the graphical hierarchy and state blocks A, B, C, and D; and information 560 associated with the textual code.

Information 540 may not be generated if all of the graphical symbols, in chart information 530, are understood by graphical engine 226. In such a situation, parser 222 may provide information 540 associated with the graphical symbols directly to graphical engine 226. In one example, information 540 may include the text after(3, sec) or after (abs(a*eig(b(1:10, 1:10))), sec), which may not be understood by graphical engine 226 since graphical engine 226 does not understand TCE language syntax (e.g., abs(a*eig (b))). In this example, parser 222 may provide the text to transformer 224, and transformer 224 may transform the text into a form understood by graphical engine 226 (e.g., transformed graphical symbols 545, as shown in FIG. 5C). For example, transformer 224 may transform the text to utilize counters maintained by the graphical environment (e.g., Simulink) so that a time (e.g., one second, two seconds, etc.) may be calculated by graphical engine 226. Information 550 associated with the graphical hierarchy and state blocks A, B, C, and D may include, for example, the hierarchy and state information of state blocks A, B, C, and D, information identifying that state A is a parent state for state B, etc. Information 560 associated with the textual code may include, for example, information associated with the function foo.

Figure 5D:
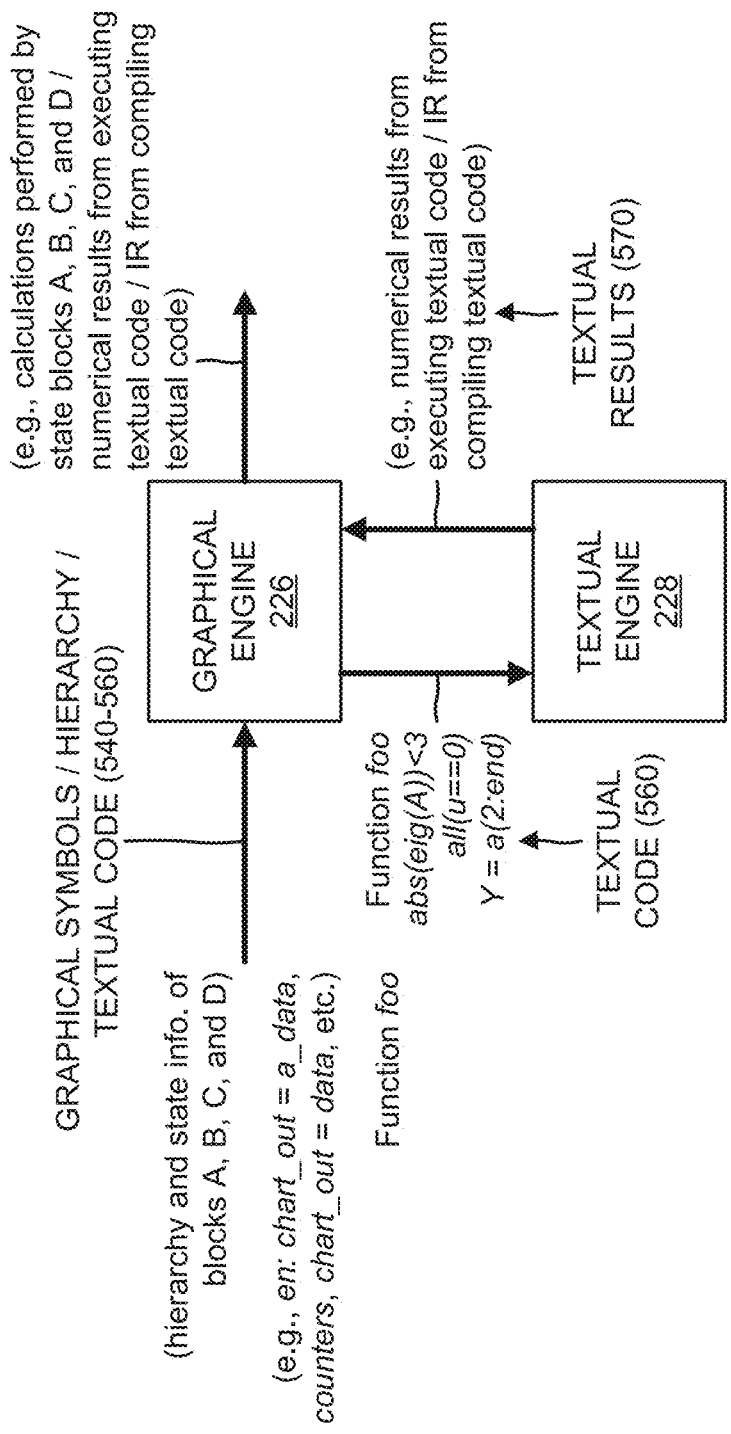

As shown in FIG. 5D, graphical engine 226 may receive information 540 associated with graphical symbols (e.g., chart_out=a_data), transformed graphical symbols 545 (e.g., counters), information 550 associated with the graphical hierarchy and state (e.g., the hierarchy and state information of state blocks A, B, C, and D), and information 560 associated with the textual code (e.g., the functions foo, abs(eig(A))<3, all(u==0), and Y=a(2:end)). In some implementations, information 560 associated with the textual code may include zero crossing detection and location information, for example, to determine when discrete events occur.

Graphical engine 226 may provide information 560 associated with textual code to textual engine 228. Textual engine 228 may process information 560 to generate textual results 570. In example 500, assume that textual results 570 include numerical results from executing the textual code (e.g., the function foo) and/or an intermediate representation (IR) from compiling the textual code. Textual engine 228 may provide textual results 570 to graphical engine 226. Graphical engine 226 may process information 540, transformed graphical symbols 545, information 550, and textual results 570 to generate chart results 580. In example 500, assume that chart results 580 include the calculations performed by one or more of state blocks A, B, C, and/or D, numerical results from executing the textual code (e.g., the function foo), and/or an intermediate representation (IR) from compiling the textual code.

Figure 5E:
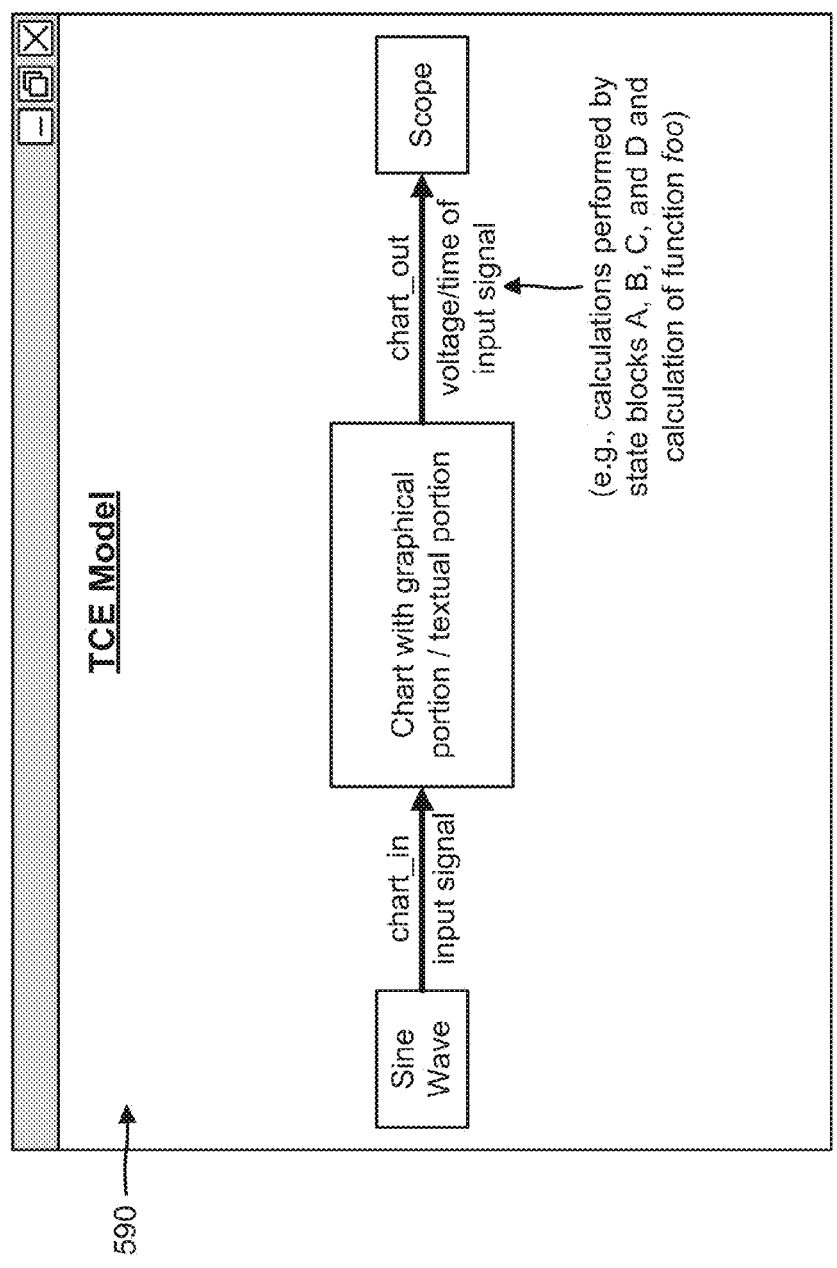

After one or more portions of the chart are executed and chart results 580 are generated, TCE 220 may utilize chart results 580 to execute the model. For example, as described above in connection with FIG. 5B, the chart may wake up and execute one or more of state blocks A, B, C, and D. In some implementations, the chart may execute one or more portions of a model and/or the model may execute one or more portions of the chart. As shown in FIG. 5E, TCE 220 may cause client device 210 to display a user interface 590 that includes the executed model. As shown in user interface 590, the chart block may receive an input signal (e.g., a sine wave) from the sine wave block, and may output a voltage/time signal, based on the input signal, to the scope block. As further shown, the voltage/time signal may correspond to the calculations performed by state blocks A, B, C, and/or D and/or the calculation of the function foo.

As indicated above, FIGS. 5A-5E are provided merely as an example. Other examples are possible and may differ from what was described with regard to FIGS. 5A-5E.

FIG. 6 is a flow chart of an example process 600 for performing time-based operations via textual code in a technical computing environment. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving a TCE state chart with a single section that includes a time-based portion and an output portion (block 610). For example, TCE 220 may cause client device 210 to display a user interface to a user of client device 210. The user interface may include mechanisms (e.g., menus, buttons, icons, libraries, etc.) that enable the user to create a state chart for TCE 220. In some implementations, the user may wish to create a state chart with one or more chart elements (e.g., state blocks, junctions, transitions, etc.), one or more input signals, and one or more output signals. Each of the state chart elements may be associated with a state of a physical device, a subsystem, another model, etc. of a system being modeled.

In some implementations, the user of client device 210 may utilize TCE 220 to import the state chart into TCE 220 from memory (e.g., memory 330 or storage component 340) of client device 210. In some implementations, the user of client device 210 may utilize TCE 220 to import the state chart into TCE 220 from another source, such as, for example, server device 230 or an external memory device (e.g., a CD-ROM, a flash memory, etc.).

In some implementations, the state chart may include at least one state block that includes a single section of textual code that is understood by graphical engine 226 and/or textual engine 228 of TCE 220. The single section may include a time-based portion and an output portion. The time-based portion may include textual code that is based on time. For example, the time-based portion may include a derivative (e.g., v_dot) of a velocity (v) of an object. The derivative of the velocity (v) may provide the acceleration (a) of the object. In some implementations, the textual code of the time-based portion may be understood and processed by graphical engine 226 of TCE 220. The output portion may include an output that is associated with the derivative of the velocity. For example, the output portion may include a calculation of movement of the object based on the acceleration of the object. In some implementations, the textual code of the output portion may be understood and processed by textual engine 228 of TCE 220.

As further shown in FIG. 6, process 600 may include detecting, or receiving selection of, a textual language associated with the single section (block 620). For example, TCE 220 may automatically detect an action language that is utilized in the single section of textual code. In some implementations, the action language may include a TCE-based language, the C language, the Pascal language, the Fortran language, etc. TCE 220 may have access to a data structure that includes syntax associated with a variety of action languages. TCE 220 may compare the syntax utilized in the single section of textual code with the syntax provided in the data structure to detect the action language that is utilized in the single section.

In some implementations, TCE 220 may cause client device 210 to display a selection mechanism (e.g., a button, an icon, a menu, etc.) in the user interface. The selection mechanism may enable the user to select an action language for the textual code of the single section. For example, if the user selects the selection mechanism, client device 210 may display a window, or some other display mechanism, in the user interface. In some implementations, the window may include a list of action languages, and the user may select the action language for the single section from the list. In some implementations, the window may instruct the user to input the action language of the single section, and the user may input the action language (e.g., via a command prompt) based on the instruction. In some implementations, when the window is displayed, an initial selection may be based on an automatic determination of what the action language may be (e.g., existing syntax in the model, a previously-used action language, a user-configured default preference, etc.).

As further shown in FIG. 6, process 600 may include initiating execution of the TCE state chart (block 630). For example, the user may instruct TCE 220 to execute the state chart, and TCE 220 may initiate execution of the state chart based on the user's instructions. In some implementations, TCE 220 may initiate execution of the state chart when the user inputs a command or selects a display mechanism (e.g., a button, a menu item, etc.) that instructs TCE 220 to execute the state chart. For example, TCE 220 may cause client device 210 to display an Execution button in the user interface. When the user selects the Execution button, the selection may cause TCE 220 to initiate execution of the state chart. In another example, TCE 220 may cause client device 210 to display a command window in the user interface. The user may enter a command (e.g., "execute state chart") in the command window, and TCE 220 may initiate execution of the state chart based on the entered command.

As further shown in FIG. 6, process 600 may include parsing the single section into the time-based portion and the output portion (block 640). For example, parser 222 of TCE 220 may receive chart information associated with the state chart. In some implementations, the chart information may include information associated with state blocks, sections of the state blocks, textual code of the state blocks, etc. provided in the state chart. TCE 220 may identify, based on the chart information, a portion of the state chart that may be understood and processed by graphical engine 226 (e.g., the time-based portion of the single section), and a portion of the state chart that may be understood and processed by textual engine 228 (e.g., the output portion of the single section).

In some implementations, parser 222 may have access to a data structure (e.g., a database) that stores information associated with the graphical environment of TCE 220 (e.g., and understood by graphical engine 226). Parser 222 may compare the chart information with information stored in the data structure, and may determine that particular portions of the chart information match the information in the data structure. Parser 222 may designate the matching portions of the chart information as a graphical portion. For example, parser 222 may designate the time-based portion of the single section as the graphical portion. Parser 222 may provide the time-based portion of the single section to graphical engine 226.

In some implementations, parser 222 may have access to a data structure (e.g., a database) that stores syntax associated with the language of the textual environment of TCE 220 (e.g., and understood by textual engine 228). Parser 222 may compare the chart information with the syntax stored in the data structure, and may determine that particular portions of the chart information match the syntax. Parser 222 may designate the matching portions of the chart information as a textual portion. For example, parser 222 may designate the output portion of the single section as the textual portion. Parser 222 may provide the output portion of the single section to textual engine 228.

As further shown in FIG. 6, process 600 may include processing the time-based portion and the output portion, based on the textual language, to generate a time-based method and an output method for output code (block 650). For example, graphical engine 226 may process the time-based portion of the single section to generate a time-based method for output code. The output code may include code (e.g., C code, C++ code, HDL code, etc.) that may be utilized by a physical device (e.g., a robot, manufacturing equipment, etc.). In some implementations, graphical engine 226 may execute the time-based portion of the single section to generate the time-based method. For example, graphical engine 226 may execute any time-based functions, expressions, etc. provided in the single section of the state block. If the time-based portion includes a derivative (e.g., x_dot=v), graphical engine 226 may calculate the derivative of the variable (x) over a particular time period. The time-based method may include code (e.g., C code, C++ code, HDL code, etc.) that corresponds to the time-based functions, operations, expressions, etc. provided in the time-based portion of the single section.

In some implementations, textual engine 228 may process the output portion of the single section to generate an output method for the output code. In some implementations, textual engine 228 may execute the output portion of the single section to generate the output method. For example, assume that the output portion of the single section includes a function (e.g., p=m*v) for calculating a momentum (p) of an object. In such an example, textual engine 228 may execute the function so that the momentum calculation may be performed. The output method may include code (e.g., C code, C++ code, HDL code, etc.) that corresponds to the functions, operations, expressions, etc. provided in the output portion of the single section. In some implementations, the time-based method may be separate from the output method in the generated output code. For example, the time-based method may be separate from the output method due to separate entry points into code portions (e.g., which may be externally callable), separate threads, separate methods in an object oriented environment, separate functions, procedures, and/or modules, separate identified sections in a structured document (e.g., an XML document), etc.

In some implementations, TCE 220 may create the output code based on the time-based method generated by graphical engine 226 and the output method generated by textual engine 228. In some implementations, the output code may include results associated with execution of the state chart. For example, assume that the state chart includes a state block that receives a velocity (v), calculates a time-based function (e.g., v_dot=a) based on the velocity, and outputs an acceleration (e.g., a_out=a). In this example, the time-based method may include the calculation of v_dot=a, and the output method may include the acceleration (e.g., a_out). Thus, the output code may include code that: provides the velocity (v) to the state block; calculates the acceleration (a); and outputs the acceleration (a_out).

As further shown in FIG. 6, process 600 may include outputting or storing the output code (block 670). For example, TCE 220 may cause client device 210 to provide the output code for display to the user. In some implementations, TCE 220 may cause client device 210 to store the output code in memory (e.g., memory 330, storage component 340, etc.) associated with client device 210 and/or server device 230. In some implementations, TCE 220 may cause client device 210 to embed the output code in a physical device (e.g., a robot, manufacturing equipment, etc.) so that the physical device may operate based on the output code. For example, client device 210 may generate deployable code and may make the deployable code available to a target device that includes an embedded processor. The target device may install the deployable code and may execute the code using the embedded processor.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel and/or on distributed processing devices.

Figure 7A:
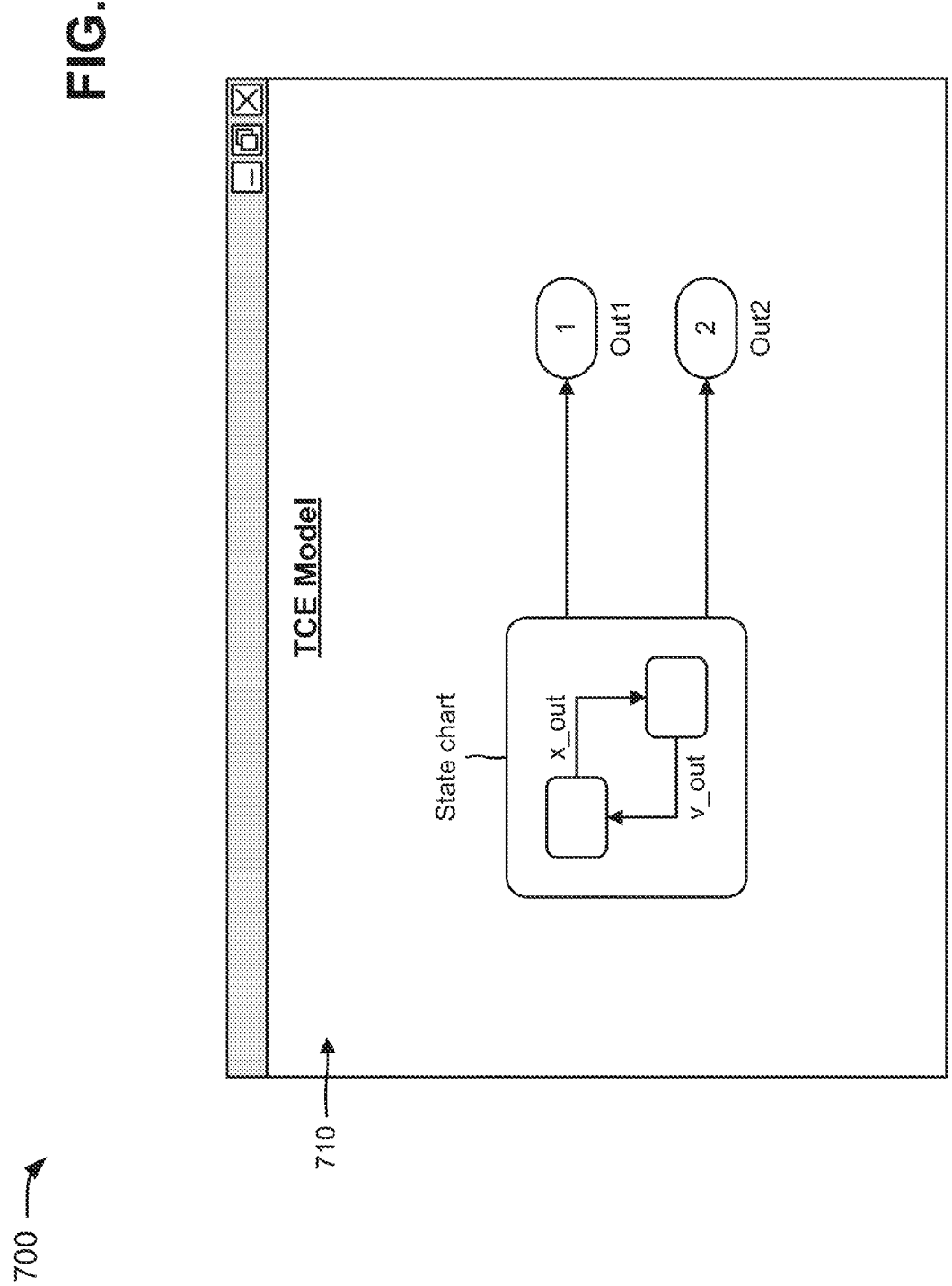

FIGS. 7A-7F are diagrams of an example 700 relating to example process 600 shown in FIG. 6. In example 700, assume that a user of client device 210 utilizes TCE 220 to create a model or to import the model into TCE 220. As shown in FIG. 7A, TCE 220 may cause client device 210 to display the model in a user interface 710 as the user creates the model or after the user imports the model. Assume that the model includes a state chart that provides a first output (e.g., Out1) and a second output (e.g., Out2). The state chart may include a representation of calculations to be performed. In example 700, assume that the state chart calculates an output distance (e.g., x_out) as the first output, and an output velocity (e.g., v_out) as the second output.

In example 700, assume that the user utilizes TCE 220 to create the state chart or to import the state chart into TCE 220 and the model. For example, the user may select the state chart block of the model in user interface 710, and TCE 220 may display a user interface 720 that enables the user to create the elements of the state chart, as shown in FIG. 7B. As shown, TCE 220 may cause client device 210 to display the state chart as the user creates the state chart or after the user imports the state chart. In example 700, assume that the state chart includes a single state block (e.g., a Falling state block). The state block may include a representation of calculations to be performed for a falling object. As further shown in FIG. 7B, the state block may receive inputs for performing the calculations for the object. For example, the inputs may include an initial distance vector of values of the object and an initial velocity (e.g., v=15 meters/second) of the object. Assume that the state block includes a single section of textual code that may be understood by graphical engine 226 and/or textual engine 228 of TCE 220.

The single section may include a time-based portion and an output portion. The time-based portion may include textual code that is based on time. For example, the time-based portion may include a derivative (e.g., x_dot) of the distance (x) of the object. The derivative of the distance vector of values (x) may provide a velocity vector of values (v) of the object (e.g., in meters/second). The time-based portion may also include a derivative (e.g., v_dot) of the velocity v) of the object. The derivative of the velocity (v) may provide an acceleration of the object (e.g., in meters/ second$^2$). The acceleration of the object may be calculated based on a function (e.g., $-G*M/(r*r)$), where G corresponds to a gravitational constant (e.g., $6.67\times10^{-11}$), M corresponds to a mass of a planet, and r corresponds to a distance between the object and a center of the planet (e.g., r may correspond to a sum of the distance (x) and a radius (R) of the planet). In example 700, assume that G, M, and R are provided as inputs to the state block, although not shown in FIG. 7B.

The output portion may include textual code that is associated with the distance of the object and the velocity of the object. For example, the output portion may include a calculation of a final distance (e.g., x_out=x) of the object and a calculation of a final velocity (e.g., v_dot=v) of the object. As further shown in FIG. 7B, if the distance (x) is less than or equal to zero (e.g., x<=0) and the velocity (v) is less than zero (e.g., v<0), the state block may set the distance (x) to zero (e.g., x=0) and may calculate the velocity (v) according to a particular function (e.g., v=-0.8*v). The state block may output the calculated final distance (x_out) and final velocity (v_out) of the object.

In some implementations, TCE 220 may automatically detect an action language (e.g., a TCE-based language, the C language, the Pascal language, the Fortran language, etc.) that is utilized in the single section. In some implementations, TCE 220 may cause client device 210 to display a selection mechanism (e.g., a button) in user interface 720 of FIG. 7B. The button may enable the user to select an action language for the textual code of the single section. For example, if the user selects the button, client device 210 may display a window to the user, as shown in a user interface 730 of FIG. 7C. As shown, the window may include a list of action languages, and the user may select the action language for the single section from the list. In example 700, assume that the user selects the TCE-based language as the action language for the single section.

Figure 7D:
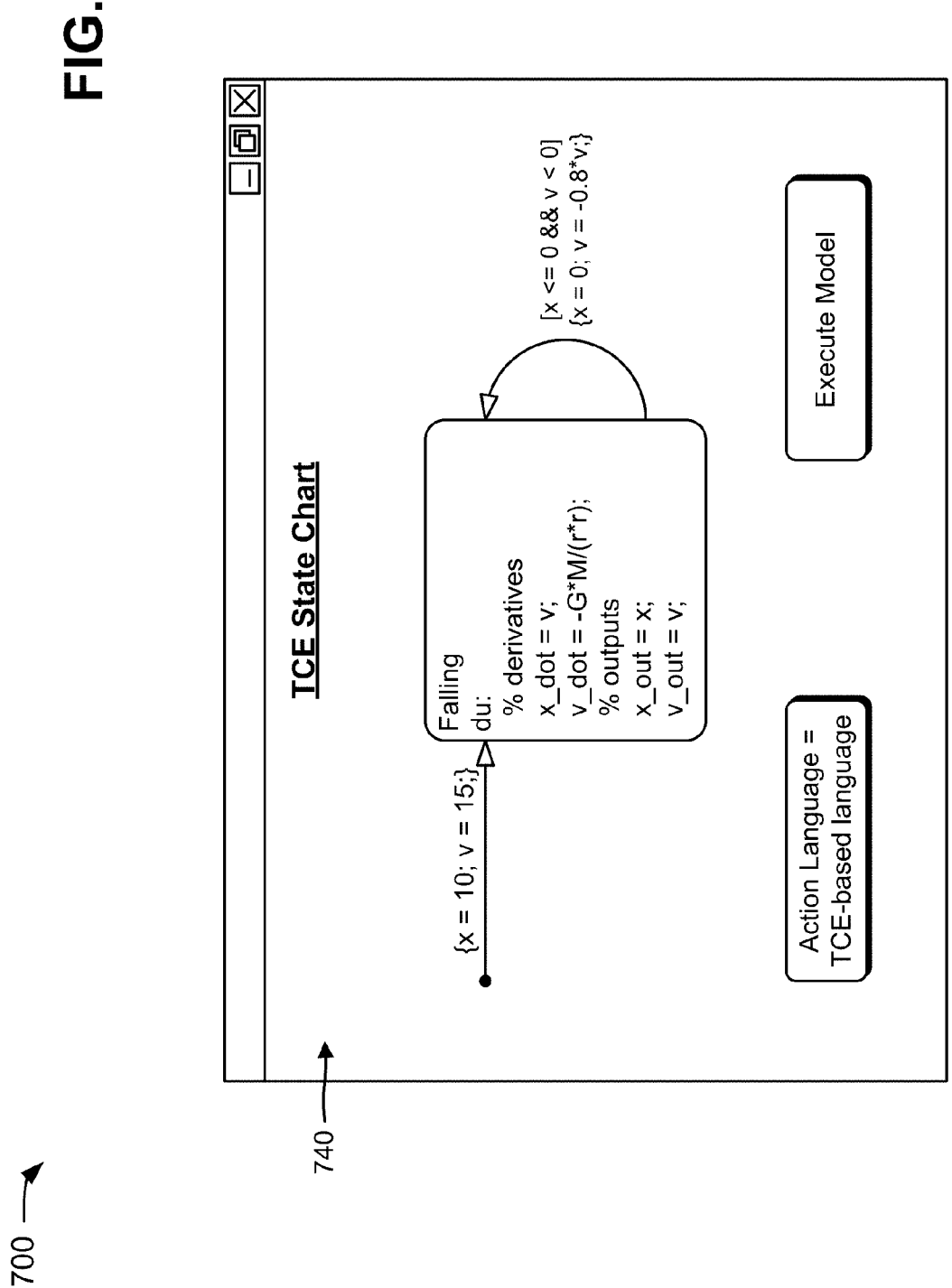

After selecting the action language, assume that the user instructs TCE 220 to execute the model by entering an "execute model" command or by selecting an "execute model" button, as shown in a user interface 740 of FIG. 7D. TCE 220 may execute the model and the state chart based on the user's instruction. When the state chart is executed by TCE 220, the Falling state block may receive inputs x=10 and v=15, and may calculate the derivatives (e.g., x_dot and v_dot) of the time-based portion. The state block may calculate the outputs (e.g., x_out and v_out) of the output portion, and may provide the outputs for display.

As shown in FIG. 7E, when executing the state chart, TCE 220 may provide section information 750 to parser 222 of TCE 220. Section information 750 may include, for example, information associated with the arrangement of the state block, information associated with the time-based portion (e.g., x_dot=v and v_dot=-G*M(r*r)), and information associated with the output portion (e.g., x_out=x and v_out=v). Parser 222 may divide section information 750 into a time-based portion 760 and an output portion 770. In example 700, assume that time-based portion 760 includes the syntax x_dot=v and v_dot=-G*M(r*r), and that output portion 770 includes the syntax x_out=x and v_out=v.

As further shown in FIG. 7E, parser 222 may provide time-based portion 760 to graphical engine 226, and graphical engine 226 may process time-based portion 760 to generate a time-based method generated code 780. Generated code 780 may include code that may be utilized by a physical device. In example 700, graphical engine 226 may calculate the derivatives (e.g., x_dot=v and v_dot=-G*M (r*r)) of time-based portion 760, and may generate the time-based method using the calculated derivatives. Parser 222 may provide output portion 770 to textual engine 228, and textual engine 228 may process output portion 770 to generate an output method for generated code 780. Textual engine 228 may include a method that calculates a current output using a current state as calculated by graphical engine 226. The method may be called by TCE 220 based on execution semantics of the model. In example 700, textual engine 228 may calculate the final distance (x_out) and the final velocity (v_out) of the object, and may generate the output method using the calculated final distance and final velocity. TCE 220 may prevent the user from defining both a time-based derivative of a signal and an instantaneous value of the signal in some state. The user may define the behavior of a signal in different ways in different states.

As further shown in FIG. 7E, TCE 220 may create generated code 780 based on the time-based method generated by graphical engine 226 and the output method generated by textual engine 228. In example 700, the time-based method may include the calculation of x_dot and v_dot, and the output method may include the calculation of x_out and v_out. Thus, generated code 780 may include code that provides the initial distance (x) and velocity (v) to the state block, calculates the derivatives (e.g., x_dot and v_dot), and outputs the final distance and velocity (e.g., x_out and v_out). TCE 220 may cause client device 210 to display generated code 780 to the user, as shown in a user interface 790 of FIG. 7F, to store generated code 780, and/or to store generated code 780.

As indicated above, FIGS. 7A-7F are provided merely as an example. Other examples are possible and may differ from what was described with regard to FIGS. 7A-7F.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code is to be broadly interpreted to include text-based code that may not require further processing to execute (e.g., C code, C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving a state chart generated via a technical computing environment,
      the state chart including at least one state block with a single section of textual code,
         the single section of textual code including a time-based portion and an output portion, and
      the receiving the state chart being performed by a device;
   initiating execution of the state chart,
      the initiating the execution of the state chart being performed by the device;
   transforming the time-based portion, which is not understood by a graphical engine of the technical computing environment, into a transformed time-based portion that is understood by the graphical engine,
      the transforming the time-based portion into the transformed time-based portion including:
         providing text included in the time-based portion to a transformer, and
         transforming, with the transformer, the text included in the time-based portion so that a time is calculated by the graphical engine,
      the transforming being performed by the device;
   processing, during the execution of the state chart, the transformed time-based portion with the graphical engine of the technical computing environment,
      the processing the transformed time-based portion being performed by the device;
   generating a time-based method based on the processing of the transformed time-based portion,
      the generating the time-based method being performed by the device,
   processing, during the execution of the state chart, the output portion with a textual engine of the technical computing environment,
      the processing the output portion being performed by the device;
   generating an output method based on the processing of the output portion,
      the generating the output method being performed by the device; and
   providing the time-based method and the output method in output code,
      the time-based method being separate from the output method in the output code, and
      the providing being performed by the device.

2. The method of claim 1, further comprising:
   automatically detecting a textual language associated with the single section of textual code; and
   where processing the transformed time-based portion includes:
      processing the transformed time-based portion based on the textual language.

3. The method of claim 1, further comprising:
   receiving a selection that identifies a textual language associated with the single section of textual code; and
   where processing the transformed time-based portion includes:
      processing the transformed time-based portion based on the textual language.

4. The method of claim 1, further comprising:
   receiving an instruction to initiate execution of the state chart; and
   initiating the execution of the state chart based on the instruction.

5. The method of claim 1, where the time-based portion includes a calculation of a derivative of a variable.

6. The method of claim 1, where the time-based portion includes syntax of a form:
   x_dot,
where x corresponds to a variable and dot corresponds to a derivative calculation.

7. The method of claim 1, further comprising:
   outputting or storing the output code.

8. A device, comprising:
   one or more processors to:
      receive a state chart generated via a technical computing environment,
         the state chart including at least one state block with a section of textual code,
            the section of textual code including a time-based portion and an output portion, initiate execution of the state chart,
transform the time-based portion, which is not understood by a graphical engine of the technical computing environment, into a transformed time-based portion that is understood by the graphical engine,
the one or more processors, when transforming the time-based portion into the transformed time-based portion, are to:
provide text included in the time-based portion to a transformer, and
transform, with the transformer, the text included in the time-based portion so that a time is calculated by the graphical engine;
process, during the execution of the state chart, the transformed time-based portion with the graphical engine of the technical computing environment to generate a time-based method,
process, during the execution of the state chart, the output portion with a textual engine of the technical computing environment to generate an output method,
provide the time-based method and the output method in output code,
the time-based method being separate from the output method in the output code, and
store the output code.

9. The device of claim 8, where the one or more processors are further to one of:
provide the output code for display, or
provide the output code to a physical device separate from the device.

10. The device of claim 8, where the one or more processors are further to:
automatically detect a textual language associated with the section of textual code; and
the one or more processors, when processing the transformed time-based portion, are to:
process the transformed time-based portion based on the textual language.

11. The device of claim 8, where the one or more processors are further to:
receive a selection of a textual language associated with the section of textual code; and
the one or more processors, when processing the transformed time-based portion, are to:
process the transformed time-based portion based on the textual language.

12. The device of claim 8, where the state chart is provided in a model and the one or more processors are further to:
receive an instruction to initiate execution of the model, and
initiate the execution of the model based on the instruction,
where execution of the state chart is initiated based on the execution of the model.

13. The device of claim 8, where the time-based portion includes a calculation of a derivative of a variable.

14. The device of claim 8, where the time-based portion includes syntax of a form:
x_dot,
where x corresponds to a variable and dot corresponds to a derivative calculation.

15. A non-transitory computer-readable medium storing instructions, the instructions comprising:
one or more instructions that, when executed by one or more processors, cause the one or more processors to:
receive a state chart generated via a technical computing environment,
the state chart including at least one state block with a single section of textual code,
the single section of textual code including a time-based portion and an output portion,
receive an instruction to initiate execution of the state chart,
initiate the execution of the state chart based on the instruction,
transform the time-based portion, which is not understood by a graphical engine of the technical computing environment, into a transformed time-based portion that is understood by the graphical engine,
the one or more instructions, that cause the one or more processors to transform the time-based portion into the transformed time-based portion, include one or more instructions that cause the one or more processors to:
provide text included in the time-based portion to a transformer, and
transform, with the transformer, the text included in the time-based portion so that a time is calculated by the graphical engine,
process, during the execution of the state chart, the transformed time-based portion with the graphical engine to generate a time-based method,
process, during the execution of the state chart, the output portion with a textual engine of the technical computing environment to generate an output method,
provide the time-based method and the output method in output code,
the time-based method being separate from the output method in the output code, and
store the output code.

16. The non-transitory computer-readable medium of claim 15, where the instructions further comprise:
one or more instructions that, when executed by the one or more processors, cause the one or more processors to:
automatically detect a textual language associated with the single section of textual code; and
the one or more instructions, that cause the one or more processors to process the transformed time-based portion, include:
one or more instructions that cause the one or more processors to process the transformed time-based portion based on the textual language.

17. The non-transitory computer-readable medium of claim 15, where the instructions further comprise:
one or more instructions that, when executed by the one or more processors, cause the one or more processors to:
receive a selection of a textual language associated with the single section of textual code; and
the one or more instructions, that cause the one or more processors to process the transformed time-based portion, include:
one or more instructions that cause the one or more processors to process the transformed time-based portion based on the textual language.

18. The non-transitory computer-readable medium of claim 15, where the state chart is provided in a model and the instructions further comprise:

one or more instructions that, when executed by the one or more processors, cause the one or more processors to:
    receive an instruction to initiate execution of the model, and
    initiate the execution of the model based on the instruction,
        where execution of the state chart is initiated based on the execution of the model.

19. The non-transitory computer-readable medium of claim 15, where the time-based portion includes a calculation of a derivative of a variable.

20. The non-transitory computer-readable medium of claim 15, where the time-based portion includes syntax of a form:
    x_dot,
where x corresponds to a variable and dot corresponds to a derivative calculation.

* * * * *